(12) United States Patent
Streijl et al.

(10) Patent No.: US 7,929,552 B2
(45) Date of Patent: Apr. 19, 2011

(54) AUTOMATED IP POOL MANAGEMENT

(75) Inventors: Robert C. Streijl, Cumming, GA (US);
Homayoun Torab, Snellville, GA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 886 days.

(21) Appl. No.: 11/588,164

(22) Filed: Oct. 26, 2006

(65) Prior Publication Data

US 2008/0101353 A1    May 1, 2008

(51) Int. Cl.
*H04L 12/28*    (2006.01)
(52) U.S. Cl. ..................... 370/401; 709/226
(58) Field of Classification Search .............. 370/401, 370/389; 709/220–223, 226–228
See application file for complete search history.

(56) References Cited

U.S. PATENT DOCUMENTS

| | | |
|---|---|---|
| 5,671,354 A | 9/1997 | Ito et al. |
| 5,684,950 A | 11/1997 | Dare et al. |
| 5,812,819 A | 9/1998 | Rodwin et al. |
| 5,835,720 A | 11/1998 | Nelson et al. |
| 5,835,725 A | 11/1998 | Chiang et al. |
| 5,835,727 A | 11/1998 | Wong et al. |
| 5,854,901 A | 12/1998 | Cole et al. |
| 5,898,780 A | 4/1999 | Liu et al. |
| 5,918,016 A | 6/1999 | Brewer et al. |
| 5,974,453 A | 10/1999 | Andersen et al. |
| 6,009,103 A | 12/1999 | Woundy |
| 6,021,429 A | 2/2000 | Danknick |
| 6,026,441 A | 2/2000 | Ronen |
| 6,052,725 A | 4/2000 | McCann et al. |
| 6,081,768 A * | 6/2000 | Hu et al. ................. 702/66 |
| 6,178,455 B1 | 1/2001 | Schutte et al. |
| 6,249,813 B1 | 6/2001 | Campion et al. |
| 6,381,650 B1 | 4/2002 | Peacock |
| 6,427,170 B1 | 7/2002 | Sitaraman et al. |
| 6,513,066 B1 | 1/2003 | Hutton et al. |
| 6,564,216 B2 | 5/2003 | Waters |
| 6,587,455 B1 | 7/2003 | Ray et al. |
| 6,618,757 B1 | 9/2003 | Babbitt et al. |
| 6,697,360 B1 * | 2/2004 | Gai et al. ................. 370/389 |
| 6,795,709 B2 | 9/2004 | Agrawal et al. |
| 6,799,204 B1 | 9/2004 | Baba et al. |
| 6,988,148 B1 | 1/2006 | Sheth |
| 7,197,549 B1 * | 3/2007 | Salama et al. ............. 709/223 |
| 2001/0025312 A1 | 9/2001 | Obata |
| 2002/0013847 A1 | 1/2002 | Fisher et al. |
| 2002/0138614 A1 | 9/2002 | Hall |
| 2002/0155827 A1 | 10/2002 | Agrawal et al. |
| 2003/0120766 A1 | 6/2003 | Ishiyama et al. |
| 2004/0073642 A1 | 4/2004 | Iyer |
| 2005/0132058 A1 | 6/2005 | Hippelainen |
| 2005/0157664 A1 * | 7/2005 | Baum et al. .............. 370/256 |
| 2006/0062160 A1 | 3/2006 | Kim et al. |
| 2006/0265272 A1 * | 11/2006 | Bosa et al. ................ 705/10 |

* cited by examiner

*Primary Examiner* — Dang T Ton
*Assistant Examiner* — Kevin Lee
(74) *Attorney, Agent, or Firm* — Cantor Colburn LLP

(57) ABSTRACT

Automatically allocating, modifying, and deleting IP pools for use by network equipment. The network equipment is repeatedly, periodically, or continuously monitored to detect IP pool utilization. If the monitoring indicates an increase in IP pool utilization above a first predetermined threshold, a quantity of required IP pools is forecasted. The forecasted quantity of required IP pools is removed from an inventory of available IP pools and automatically assigned to the network equipment.

18 Claims, 18 Drawing Sheets

| CLASS | FIRST | START | END | DEFAULT SUBNET MASK | CIDR NOTATION |
|---|---|---|---|---|---|
| A | 0 | 1.0.0.0 | 126.0.0.0 | 255.0.0.0 | /8 |
| B | 10 | 128.0.0.0 | 191.255.0.0 | 255.255.0.0 | /16 |
| C | 110 | 192.0.0.0 | 223.255.255.0 | 255.255.255.0 | /24 |
| D | 1110 | 224.0.0.0 | 239.255.255.0 | | |
| E | 1111 | 240.0.0.0 | 255.255.255.0 | | |

FIG. 7

| NAME | TYPE | ACCESS | DESCRIPTION |
|---|---|---|---|
| Id | IPAddress | PROTECTED | Key to this object (startAddress) |
| startAddress | IPAddress | PROTECTED | The starting IP address |
| endAddress | IPAddress | PROTECTED | The ending IP address |
| type | int | PROTECTED | The Subscriber or Infrastructure Enumeration |
| LataID | String | PROTECTED | The LATA CLLI for the allocated IP address range |

FIG. 8

AUTOMATED IP POOL MANAGEMENT

BACKGROUND

Exemplary embodiments relate generally to communications networks and, more particularly, to methods, systems, and computer program products for automatically managing pools of IP addresses.

Communications networks are frequently employed to provide users with access to the public Internet, a private Intranet, or both. Typically, a user accesses the Internet or Intranet by activating a network interface operably coupled to the communications network. In the case of broadband Internet access, this network interface may take the form of a cable modem, DSL (digital subscriber link) modem, wireless transceiver, or the like. Activation of the network interface is detected by an Internet service provider operably coupled to the communications network. However, in order to provide Internet access to the user, the service provider must first assign an IP address to the user. The assignment may be either static or dynamic. Static assignments are those assignments that have pre-configured IP addresses on a network interface (e.g. those of the customer equipment or ISP network equipment interfaces). However, for most residential customers, IP addresses are assigned dynamically. The assigned IP address is obtained from an IP pool that includes a plurality of IP addresses. The Internet service provider's network equipment sends the assigned IP address to the user's network interface, whereupon the customer's network interface is now able to access the Internet using the assigned IP address. At present, the ISP must manually create the IP pools on their equipment for dynamic assignment to customer equipment. A network administrator specifies desired starting and ending IP addresses for one or more IP pools per network equipment by typing the appropriate commands into a communications network interface device. Although various vendor management systems have been developed to facilitate the creation of IP pools, these systems nonetheless require manual entry of starting and ending IP addresses. The addresses are entered using a GUI interface, and then conveyed to the communications network. Irrespective of whether or not a vendor management system is employed, problems may arise if the created IP pool does not contain a sufficient number of IP addresses. If all available IP addresses are already assigned to existing users, then new users will be denied access. On the other hand, it is wasteful and inefficient to create one or more large IP pools if most of the IP addresses included therein will never be utilized. Public IP space is a scarce resource that needs to be requested from a public entity, which, in North America, is the American Registry for Internet Numbers (ARIN). When users request IP pools that remain underutilized, this approach deprives others of access. However, even with the best of intentions, it is not always possible to accurately project future demand for IP addresses. Manual creation of IP pools is an iterative process involving a certain amount of trial and error. On occasion, a user may be deprived of access to the Internet due to inaccurate projections in the number of new IP addresses required. What is needed is a method for automatically creating additional IP pools in response to user demand such that users are not deprived of Internet access, and such that a finite amount of IP space is utilized in an efficient manner.

BRIEF SUMMARY

Exemplary embodiments relate to methods of automatically allocating, modifying, and deleting IP pools on network equipment. The network equipment is repeatedly, periodically, or continuously monitored to detect IP pool utilization. If the monitoring indicates an increase in IP pool utilization above a first predetermined threshold, a quantity of required IP pools is forecasted. The forecasted quantity of required IP pools is removed from an inventory of available IP pools and automatically assigned to the network equipment.

Additional exemplary embodiments include computer program products comprising a storage medium readable by a processing circuit and storing instructions for execution by the processing circuit for facilitating methods of automatically allocating IP pools to network equipment. The network equipment is repeatedly, periodically, or continuously monitored to detect IP pool utilization. If the monitoring indicates an increase in IP pool utilization above a first predetermined threshold, a quantity of required IP pools is forecasted. The forecasted quantity of required IP pools is removed from an inventory of available IP pools and automatically assigned to the network equipment.

Additional exemplary embodiments relate to devices for automatically allocating IP pools to network equipment. The devices include a monitoring mechanism coupled to a processing mechanism. The monitoring mechanism is capable of repeatedly, periodically, or continuously monitoring network equipment to detect IP pool utilization. If the monitoring indicates an increase in IP pool utilization above a first predetermined threshold, a processing mechanism forecasts a quantity of required IP pools. The forecasted quantity of required IP pools is removed from an inventory of available IP pools and automatically assigned to the network equipment.

Other systems, methods, and/or computer program products according to embodiments will be or become apparent to one with skill in the art upon review of the following drawings and detailed description. It is intended that all such additional systems, methods, and/or computer program products be included within this description, be within the scope of the exemplary embodiments, and be protected by the accompanying claims.

BRIEF DESCRIPTION OF DRAWINGS

Referring now to the drawings wherein like elements are numbered alike in the several FIGURES:

FIG. 7 is a data structure diagram indicating publicly utilized Internet Protocol (IP) address space, showing both a classful system and a classless system for dividing public IP space.

FIG. 8 is a data structure diagram setting forth an exemplary structure for defining one or more objects used to manage IP pools.

Figure 1:
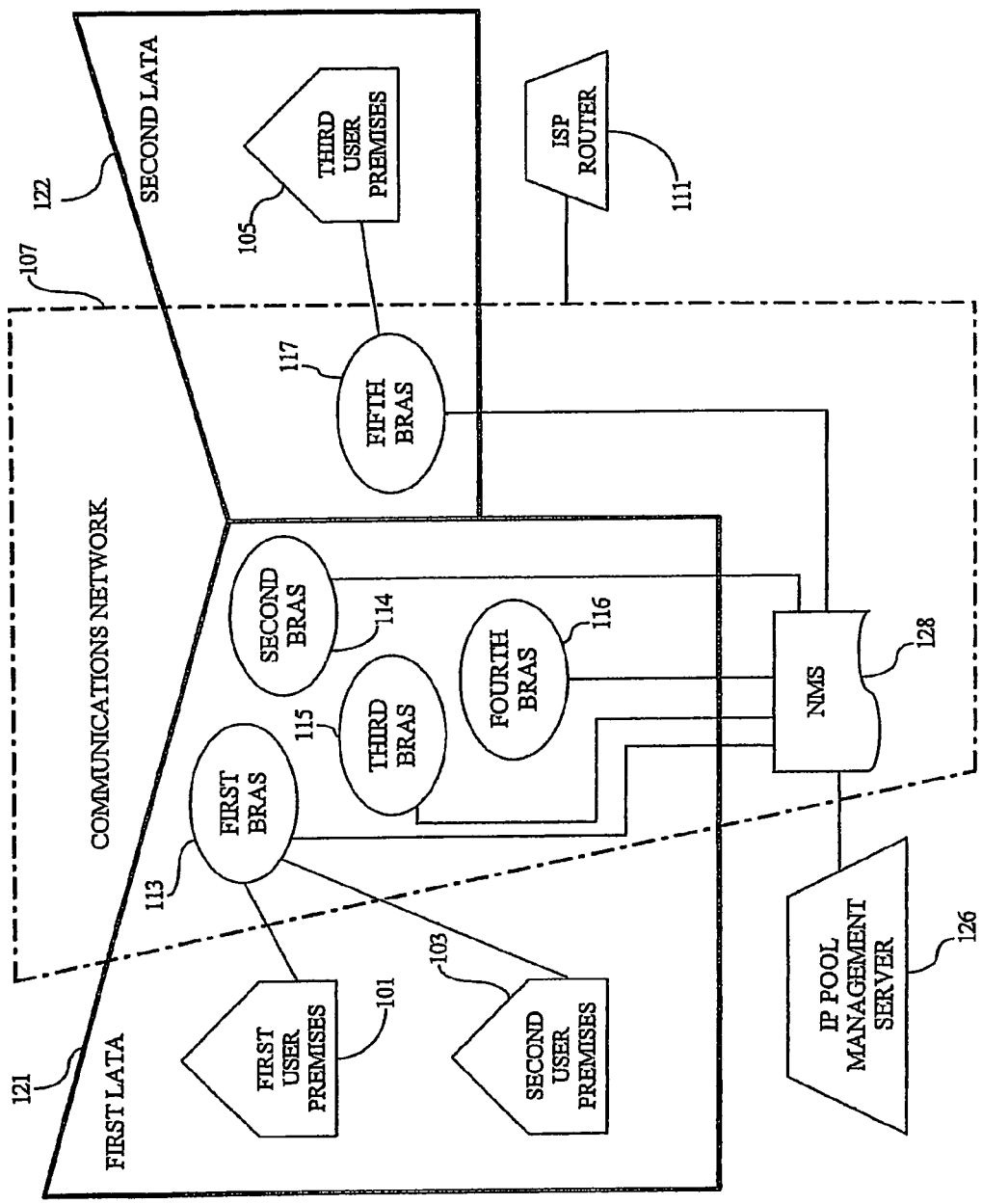
FIG. 1 is a block diagram of an exemplary system that may be utilized for managing IP pools pursuant to illustrative embodiments disclosed herein.

The detailed description explains the exemplary embodiments, together with advantages and features, by way of example with reference to the drawings.

DETAILED DESCRIPTION OF EXEMPLARY EMBODIMENTS

Glossary/Abbreviations: The following terms and abbreviations used herein are defined as follows:

ARIN: American Registry for Internet Numbers. There are currently five Internet authorities in the world that maintain IP address space. Service providers in North America must request public IP address space from ARIN.

ATM: Asynchronous Transfer Mode. Sometimes referred to as cell relay, ATM uses short, fixed-length packets called cells for transport. Information is divided among these cells.

BRAS: Broadband Remote Access Server. When a remote user initiates a PPP session, the BRAS assigns an IP address from an IP pool to the PPP session. In addition, the BRAS is an aggregation point for subscriber traffic on a communications network, and it also functions as an injection point for policy and quality of service (QoS) management.

CIDR: Classless Inter Domain Routing.

CLLI: Common Language Location Identifier. Specifies the geographic location of a communications network switch.

CORBA: Common Object Request Broker Architecture. An open, vendor-independent architecture and infrastructure that enables computer applications to work together over networks. A CORBA-based program from any vendor, on almost any computer, operating system, programming language or network, provides interoperability with a CORBA-based program from the same or another vendor, on almost any other computer, operating system, programming language, or network. CORBA interfaces commonly exist as NMS northbound interfaces to service provider OSS systems, such as BellSouth's DSL NMS.

DHCP: Dynamic Host Control Protocol. Refer to IETF Standard RFC 2131.

DSL: Digital Subscriber Line. A broadband access technology for consumers.

GUI: Graphical User Interface.

IP Pool: A pool generally refers to multiple objects. In the context of communications network equipment, IP Pools may, but need not, be created as IP Subnets with a beginning and an ending IP address. Alternatively or additionally, an IP Pool could be implemented using one or more IP Subnets.

LATA: Local Access and Transport Area. A geographically defined area, or subset thereof, in which a local exchange carrier (LEC) such as BellSouth provides communication services.

NMS: Network Management System. There are several definitions of NMS. Vendors may support Element Management Systems (EMS) which are able to manage all or a portion of a vendor's network equipment. An NMS may communicate in turn with one more EMSs, or directly with the network equipment. For service providers, an NMS is generally considered to be a multi-vendor Management System supporting configuration, fault, and performance management functions. Other names for NMS are OSS—Operations Support Systems. IP Pool Management is considered a function that may be implemented as part of an NMS or be implemented as a separate system that communicates with an NMS.

ISP: Internet Service Provider. Any entity that sells Internet services to subscribers and leverages access networks from a network service providers (NSP) such as BellSouth.

PPP: Point to Point Protocol. See IETF RFC 1661.

SNMP: Simple Network Management Protocol. Described in IETF RFC 1157. Includes a mechanism to receive network management related information from SNMP agents. Agents can also autonomously send messages called traps. Traps are unsolicited messages, but these messages need to be processed. Traps identify alerts and/or notifications.

FIG. 1 is a block diagram of an exemplary system that may be utilized for managing IP pools pursuant to illustrative embodiments disclosed herein. A communications network 107 provides access to communication services in one or more geographically defined areas. Communications network 107 may be implemented using any of a variety of networks and network components including, but not limited to, routers, switches, servers, the public switched telephone network (PSTN), the Internet, a cable television network, a wireless network, a satellite network or the like, as well as various combinations thereof. These networks and network components are equipped to communicate using one or more protocols which, for purposes of illustration, could but need not include digital subscriber line (DSL), Internet Protocol (IP), WiFi (IEEE 802.11), or WiMax (IEEE 802.16).

Exemplary implementations for communications network 107 may include a PSTN providing voice and possibly data services (e.g. Internet access) to a plurality of user premises in one or more geographically defined areas using PSTN connections and modems. Another exemplary implementation may include a DSL access network providing data services (e.g. Internet access) to a plurality of user premises in one or more geographically defined areas using DSL connections, where these areas may be defined with reference to areas receiving PSTN services. Illustratively, the one or more geographically defined areas may be divided in accordance with the manner in which the network provider manages that area. For example, in the field of telecommunications, geographically defined areas are often managed in terms of local access and transport areas (LATA), wherein the example of FIG. 1 shows two exemplary LATAs, a first LATA 121 and a second LATA 122. First LATA 121 includes a first user premises 101 and a second user premises 103. Second LATA 122 includes a third user premises 105. For explanatory purposes, communication services are provided to first, second, and third user premises 101, 103, 105 using digital subscriber line (DSL) technology capable of initiating one or more subscriber point-to-point protocol (PPP) sessions. However, it is to be understood that DSL technology is described only for illustrative purposes, as any of a number of communication protocols may be employed to provide data communication services to first, second, and third user premises 101, 103, 105.

User equipment is employed to accesses an internet service provider (ISP) over communications network 107. This functionality is performed by initiating a PPP session when a user at any of first, second, or third user premises 101, 103, 105 activates a network interface device such as a DSL modem to access communications network 107. Upon initiation of the PPP session, a broadband remote access server (BRAS) assigns an IP address from an IP pool to the PPP session. In the illustrative example of FIG. 1, first LATA 121 includes a first BRAS 113, a second BRAS 114, a third BRAS 115, and a fourth BRAS 116. Second LATA 122 includes a fifth BRAS 117. In practice, any number of areas such as LATAs may be employed, and each LATA may include any number of BRASs. Optionally, a BRAS may be shared among two or more areas (but this implementation is not likely in situations where LATAs are employed). Communications network 107 conveys the assigned IP address from a BRAS, such as first BRAS 113, to the network interface device associated with a user premises, such as first user premises 101. Once the network interface device receives the assigned IP address, the user at first user premises 101 may access the Internet over communications network 107.

In order for BRASs 113-117 to assign IP addresses, the BRAS must have access to provisioned IP pools that contain IP addresses. The use of public IP address space signifies that only one instance of an IP address may exist and be assigned at any given time. Duplication of public IP addresses would prevent proper network functionality.

BRASs 113-117 are managed by a network management system (NMS) 128. NMS 128 accepts an input from an IP pool management server 126 and, based upon this input, forwards to a BRAS of BRASs 113-117 data specifying one or more IP addresses available for subsequent assignment. Pursuant to existing techniques, creation of IP pools for use by BRASs 113-117 has been performed using any one of two manual approaches. In the first approach, a communications network administrator would log into a BRAS and manually type in a command that creates or deletes an IP pool. This command requires a starting IP address and an ending IP address for the IP pool. In the second approach, a vendor management system could be employed at NMS 128 and/or IP pool management server 126 to communicate with BRASs 113-117. Vendor management systems also require manual specification of a starting IP address and an ending IP address.

Manual creation of IP pools is a tedious, time-consuming process. For example, BRASs 113-117 will attempt to select an available (not otherwise assigned) IP address from an IP pool and assign this IP address to the subscriber session, for example a PPP session. Therefore, an administrator is required to actively monitor the assignment of IP pools by first BRAS 113 to ensure that there are always IP addresses available to service new users. If first BRAS 113 has already assigned all available IP addresses to PPP sessions of existing users, then new users will be denied access to the Internet over communications network 107. However, since public IP address space is a scarce resource that needs to be requested from a public entity such as ARIN, the assignment of IP pools should be carefully planned, so as to not assign too many pools. Accordingly, administrators are called upon to create just enough additional IP pools at just the right times to prevent denial of access.

BRASs 113-117 dynamically assign IP addresses from IP Pools to subscriber sessions, and may optionally maintain one or more additional IP addresses for other purposes. One such purpose is in situations where a network provider is engaged in a business relationship with an NSP specifying that the NSP is to provide Internet access to a customer, but the NSP lacks the physical infrastructure necessary to reach the customer. In such cases, a BRAS (such as BRAS 113) maintains an IP connection with an ISP router 111 owned by the NSP who provides the customer with Internet access. A network provider may have such relationships with one or more ISPs. In such cases, BRAS 113 must also have an IP address assigned to a network-side interface of the BRAS This IP address must be in the same subnet as the IP address on the connected ISP router 111. The IP Pool management system could be responsible for managing these types of IP addresses, maintained as pools. Illustratively, ISP router 111 is used to provide users with Internet access and/or access to one or more third-party services. An IP subnet with two usable IP addresses (/30) is assigned for this purpose, where the first usable IP address is assigned to first BRAS 113 for interfacing with ISP router 111 over communications network 107, and the second usable IP address is assigned to ISP router 111. It must be understood that the time of assigning IP addresses to network side interface of BRASs 113-117 need not be the same as the time at which IP addresses are assigned for user-initiated (e.g. PPP) sessions. In general, these IP "connections" are created at installation time, before BRASs 113-117 are able to provide access to the Internet for users.

With the understanding that one or more types of IP space can be managed by the techniques disclosed herein, it is possible to define two types of IP space for illustrative purposes, a first type of IP space being defined as subscriber IP space, and a second type of IP space being defined as infrastructure IP space. IP addresses are assigned to one or more user-initiated (e.g. PPP) sessions from subscriber IP space, whereas IP addresses are assigned to ISP router 111 and first BRAS 113 from infrastructure IP space. Subscriber IP space and infrastructure IP space are unrelated. In this example, there is a difference between the two types of IP space, in the sense that subscriber IP address space is dynamically assigned, not statically assigned. These IP addresses are maintained as IP Pools in network equipment including BRASs 113-117. By contrast, the infrastructure IP address space can be considered static in nature. These IP addresses are not maintained as IP Pools in network equipment (i.e., these pools are not maintained by BRASs 113-117), but may be managed, for example, as IP Pools using IP pool management server 126 and/or NMS 128.

Pursuant to embodiments disclosed herein, IP pool management server 126 provides for the automated creation and management of IP pools, so as to overcome the shortcomings of manual IP pool creation and management described previously. IP pool management server 126 provides a graphical user interface (GUI) by which administrators may add IP space, delete IP space, perhaps even assign IP pools to BRASs 113-117 directly, rather then the system itself, and maintain configuration information for one or more hardware devices (e.g. specific threshold values that can be set per BRAS) on communications network 107. IP pool management server 126 may also be capable of generating reports, including for example IP pool assignment and capacity reports. Various screens allow an administrative user to formulate a query for information as to how IP pools are currently allocated to different hierarchical levels, as exemplified previously by BRASs 113-117 and LATAs 121, 122. Illustratively, this GUI could, but need not, be implemented using a Java-based API supporting various Java classes that allow interacting with the IP Pool management system.

The IP pool management system implemented by IP pool management server 126, or NMS 128, or both and is capable of at least, but not limited to, deleting and creating IP pools, interfacing with network equipment (e.g. BRASs), collecting IP pool usage data (from either network equipment or as managed by the system itself), calculating current IP pool utilization of network equipment, forecasting of IP Pool utilization, issuing requests for more IP pools as required and generating reports for network administrators.

Figure 2:
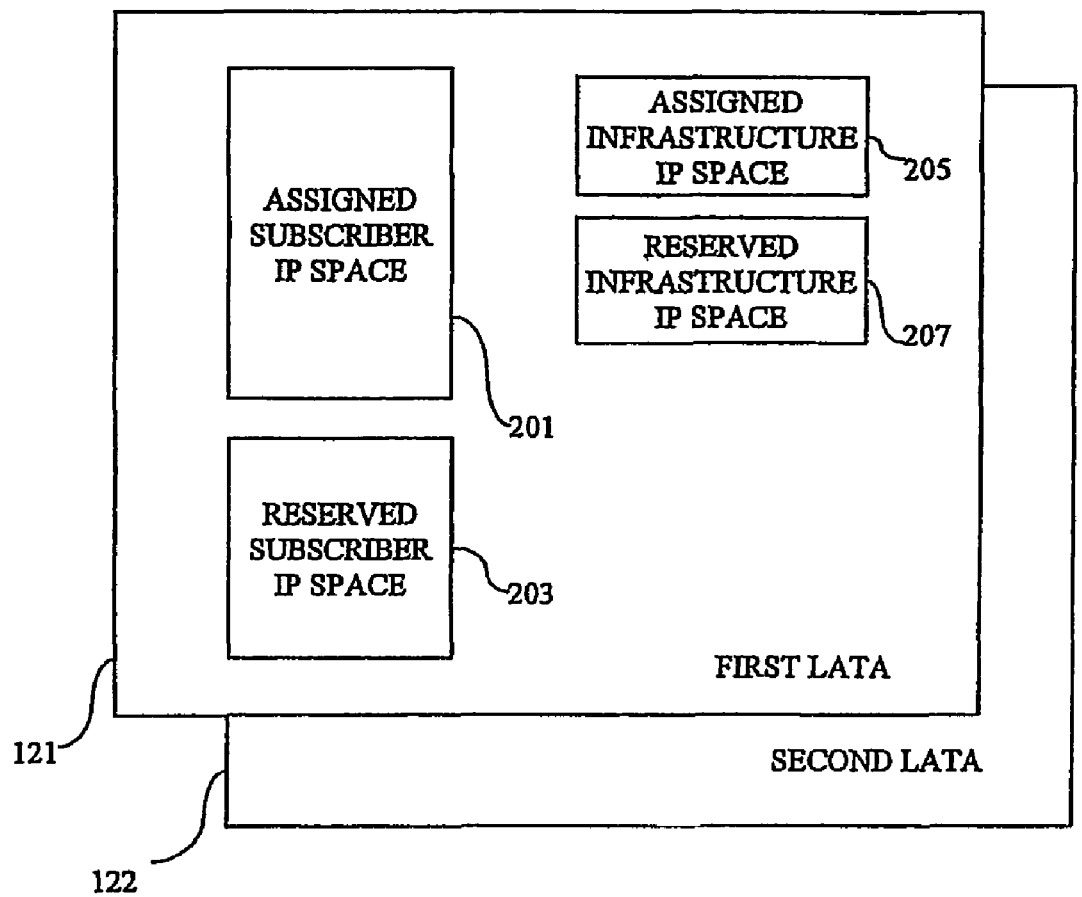
FIG. 2 is a data structure diagram showing allocation of IP pools to two exemplary local access and transport areas (LATAs), each of which utilizes subscriber IP space and infrastructure IP space.

FIG. 2 is a data structure diagram showing allocation of IP pools to two exemplary local access and transport areas (LATAs) pursuant to illustrative embodiments disclosed herein. It shall be understood that a IP Pool management system may manage IP space divided over different areas, LATAs being only one example, and at different levels of a hierarchy, LATAs for example being one level and network equipment such as BRASs being another level. A LATA is a geographically defined region, or subset thereof, in which a local exchange carrier (LEC) such as BellSouth provides communication services. IP Pool Management Server 126 and/or NMS 128 (FIG. 1) manages IP pools for each of a plurality of LATAs. The IP pools may be of different types as indicated previously, one being subscriber IP space and a second one being infrastructure IP space. As a preliminary matter, an administrator must specify IP space that can be used by IP Pool Management Server 126 and/or NMS 128 for each of the plurality of LATAs. While this is a manual action, from this point on, an IP pool management process executed by IP Pool Management Server 126 and/or NMS 128 may use logic to validate the uniqueness of the administrator-specified IP space, condition the space into IP Pools and then automatically manage IP pools for use by one or more BRASs such as first, second, third, fourth, and fifth BRASs 113-117.

IP Pool Management Server 126 and/or NMS 128 maintain one or more types of IP space that are prepared for use in BRASs 113-117 and/or used for other purposes such as assignment to network interfaces between BRASs 113-117 and ISP router 111. In this example, an assigned subscriber IP space 201 (FIG. 2), a reserved subscriber IP space 203, an assigned infrastructure IP space 205, and a reserved infrastructure IP space 207 are all maintained for first LATA 121 (FIGS. 1 and 2). IP space is also maintained for other LATAs, such as second LATA 122, in the form of assigned subscriber IP space, reserved subscriber IP space, assigned infrastructure IP space, and reserved infrastructure IP space. Subscriber IP space is defined as including assigned subscriber IP space 201 (FIG. 2) and reserved subscriber IP space 203. Infrastructure IP space is defined as including assigned infrastructure IP space 205 and reserved infrastructure IP space 207. As stated above, this subscriber IP space is dynamically assigned, not statically assigned. Subscriber IP space represents IP addresses assigned to user-initiated (e.g. PPP) sessions. Infrastructure IP address space represents IP addresses assigned to BRASs 113-117 (FIG. 1) network-side interfaces where connections with other routers such as ISP router 111 are required. Infrastructure IP addresses are not assigned to user-initiated (e.g. PPP) sessions.

Assigned IP space indicates the sum of all IP Pools assigned to a given hierarchical level, such as a first hierarchical level corresponding to LATAs 121-122 and a second hierarchical level corresponding to BRASs 113-117. Pursuant to various embodiments disclosed herein, assigned subscriber IP space 201 (FIG. 2) indicates the sum of all IP pools assigned to all BRASs in a LATA, such as first, second, third, and fourth BRASs 113-116 (FIG. 1) in first LATA 121. Over time, assigned subscriber IP space 201 (FIG. 2) is expected to increase as the address space in a LATA increases. This new address space is taken from reserved IP space, e.g. from a higher level in the hierarchy, if any, for example from all the space reserved for a LATA. Eventually, even this reserved space will exhaust, whereupon reserved subscriber IP space 203 is replenished by an administrator. Such replenishment may be based on a trigger sent by IP Pool Management Server 126 and/or NMS 128 (FIG. 1) to the administrator, or may occur at random when the administrator desires to add space without having received a trigger. Per FIG. 2, the size of reserved subscriber IP space 203 changes over time. In general, when any of first, second, third or fourth BRASs 113-116 (FIG. 1) require more IP space, that IP space will be taken from reserved subscriber IP space 203 (FIG. 2). When IP space is taken from reserved subscriber IP space 203 and assigned to a BRAS (i.e., BRAS 113, FIG. 1), then the IP space in assigned subscriber IP space 201 (FIG. 2) will increase by the amount of IP space taken from reserved subscriber IP space 203. Administrators may be provided with the option of deleting space from reserved subscriber IP space 203 or from assigned IP subscriber space depending, for example, on any optional business rules which may be implemented Assigned infrastructure IP space 205 is similar to assigned subscriber IP space 201, except that assigned infrastructure IP space 205 includes infrastructure addresses instead of addresses for assignment to user-initiated (e.g. PPP) sessions. It is expected that assigned infrastructure IP space 205 could, but need not, hold a lesser amount of IP addresses relative to assigned subscriber IP space 201.

Reserved infrastructure IP space 207 is similar to reserved subscriber IP space 203, except that reserved infrastructure IP space 207 includes infrastructure addresses instead of addresses reserved for user-initiated (e.g. PPP) sessions. It is expected that reserved infrastructure IP space 207 could, but need not, hold a lesser amount of IP addresses relative to reserved subscriber IP space 203.

FIG. 2 shows two different types of IP space in the form of subscriber space and infrastructure space. The same quantity of IP space may be provided for each of a plurality of different types of IP space, or different quantities of IP space may be provided for each type of IP space. IP space may be managed as an object with a state, where two exemplary states include "assigned" and "reserved". Subscriber space includes assigned and reserved subscriber IP space 201, 203 and infrastructure space includes assigned and reserved infrastructure IP space 205, 207. However, use of two different types of IP space is not required, as only one type of IP space could be provided, or more than two different types could be provided.

Optionally, an allocation hierarchy may be utilized, wherein the hierarchy could, but need not, be defined with respect to different types of IP space. For example, assume that IP pools are to be added per each LATA 121, 122 of FIG. 1. However, IP pools can be added at various levels within a hierarchy. For example, two hierarchical levels may be defined: a LATA level applicable to LATAs 121, 122 and a BRAS or network equipment level applicable to BRASs within a given LATA. For example, BRASs 113-116 are in LATA 121, and BRAS 117 is in LATA 122. Illustratively, IP pools can be added at the LATA level, the BRAS level, or both.

Optionally, a hierarchical allocation rule may be formulated whereby IP pools are added to subscriber IP space at the LATA level and at the BRAS level. However, IP pools are added to infrastructure IP space only at the LATA level, not the BRAS level. For example, illustratively, in the case of subscriber IP space, BRASs within a given LATA will receive IP space from the LATA to which they belong. In other words, first BRAS 113 of first LATA 121 cannot obtain IP space from second LATA 122 unless the IP space to be obtained has first been removed from second LATA 122 and assigned to first LATA 121.

Figure 3:
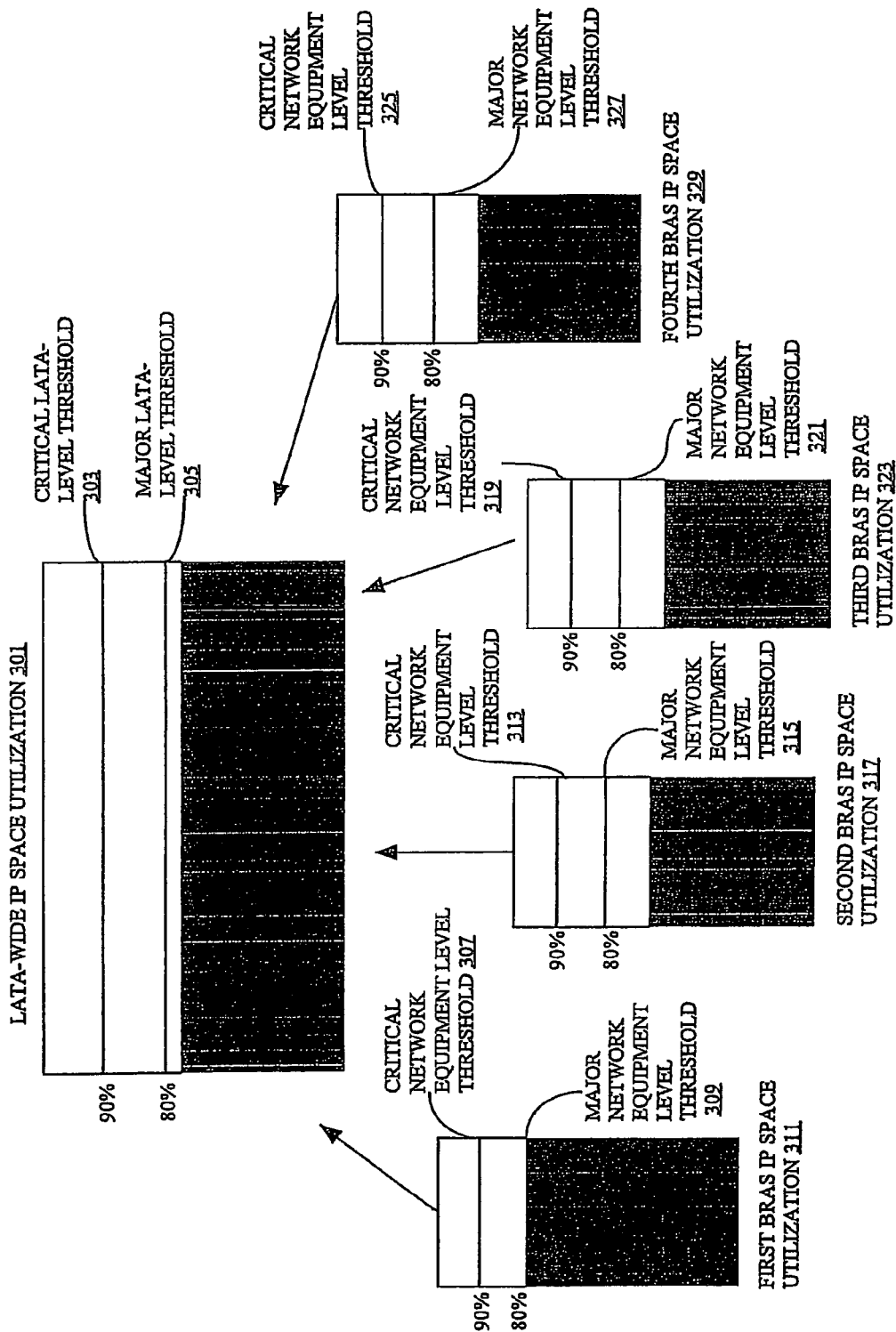
FIG. 3 is a data structure diagram showing two exemplary IP space hierarchical levels corresponding, respectively, to LATA and network equipment, such that each hierarchical level includes a major threshold value and a critical threshold value.

FIG. 3 is a data structure diagram showing exemplary LATA and network equipment thresholds for IP space utilization. These levels may, but need not, be applicable to only one type of IP address space, for example, subscriber IP space. The threshold levels serve as indicators that the network administrator may need to add one or more IP Pools, or that the network administrator may need to delete one or more IP pools in situations where a minimum threshold level is implemented Pursuant to illustrative embodiments disclosed herein, one or more administrator-configurable thresholds are employed at a LATA level and also at a network equipment level. With regard to the LATA level thresholds, FIG. 3 illustrates a LATA-wide IP space utilization 301 for first LATA 121 (FIGS. 1 and 2). For illustrative purposes, LATA-wide IP space utilization 301 includes a first LATA-level threshold in the form of a major LATA-level threshold 305, and a second LATA-level threshold in the form of critical LATA-level threshold 303. However, specific use of first and second LATA-level thresholds is not required, as any number of one or more LATA-level thresholds may be employed. In the present example, the first LATA-level threshold is set at approximately 80% of total available IP space in first LATA 121 (FIG. 1), and the second LATA-level threshold is set at approximately 90% of total available IP space in the first LATA. It is possible that, for every LATA 121, 122 and/or every BRAS 113-117, default values are assigned by IP Pool Management Server 126 and/or NMS 128, so as to minimize administrative overhead for a network administrator. On an individual basis, these defaulted values may be overridden by the network administrator. Note, however, that critical LATA-level threshold 303 (FIG. 3) may be set at a percentage that is not approximately 90% of total available IP space in the first LATA, and/or the major LATA-level threshold 305 may be set at a percentage that is not approximately 80% of total available IP space in the first LATA. Illustratively, LATA-wide utilization is shown as being approximately 78% of total allocated LATA-wide IP space.

Network equipment level thresholds for IP space utilization apply to BRASs 113-116 (FIG. 1) of first LATA 121, as well as BRAS 117 of second LATA 122. These network equipment level thresholds are illustratively implemented using IP Pool Management Server 126 and/or NMS 128 (FIG. 1). The illustrative example of FIG. 3 shows network equipment level thresholds for BRASs 113-116 of first LATA 121. A first BRAS IP space utilization 311 (FIG. 3) for first BRAS 113 (FIG. 1) shows first and second equipment level threshold in the form of a major network equipment level threshold 309 (FIG. 3) and a critical network equipment level threshold 307. Similarly, a second BRAS IP space utilization 317 (FIG. 3) for second BRAS 114 (FIG. 1) shows first and second equipment level threshold in the form of a major network equipment level threshold 315 (FIG. 3) and a critical network equipment level threshold 313. Likewise, a third BRAS IP space utilization 323 (FIG. 3) for third BRAS 115 (FIG. 1) shows first and second equipment level threshold in the form of a major network equipment level threshold 321 (FIG. 3) and a critical network equipment level threshold 319. Finally, a fourth BRAS IP space utilization 329 (FIG. 3) for fourth BRAS 116 (FIG. 1) shows first and second equipment level threshold in the form of a major network equipment level threshold 327 (FIG. 3) and a critical network equipment level threshold 325.

For some applications, use of a single network equipment threshold is suitable. In other applications, three or more network equipment levels may be suitable. Accordingly, use of first and second network equipment level thresholds as shown in the illustrative example of FIG. 3 is not required, as any number of one or more network equipment level thresholds may be employed. In the present example, the first network equipment level thresholds for each respective BRAS of BRASs 113-117 (FIG. 1) are set at approximately 80% of total available IP space, and the second network equipment level thresholds for each respective BRAS of BRASs 113-117 are set at approximately 90% of total available IP space. However, critical network equipment level thresholds 307, 313, 319, and 325 (FIG. 3) may all be set at percentages that differ from approximately 90% of total assigned IP space in a respective BRAS of BRASs 113-117 (FIG. 1). Moreover, the same percentage could, but need not, be used to implement all critical network equipment thresholds 307, 313, 319, and 325. Likewise, the major network equipment level thresholds 309, 315, 321, and 329 (FIG. 3) may all be set at percentages that differ from approximately 80% of total available IP space in a respective BRAS of BRASs 113-117 (FIG. 1). Moreover, the same percentage could, but need not, be used to implement all major network equipment thresholds 309, 315, 321, and 329 (FIG. 3). For logical reasons, critical thresholds may be assumed to have higher percentage values then major thresholds. Illustratively, first BRAS IP space utilization 311 shows that approximately 80% of the available IP space assigned to IBG 113 (FIG. 1) is being utilized, thereby meeting major network equipment level threshold 309 (FIG. 3). By contrast, second BRAS IP space utilization 317 shows that approximately 70% of the available IP space assigned to IBG 114 (FIG. 1) is being utilized, thereby not meeting major network equipment level threshold 315 (FIG. 3).

Administrator-specified values could, but need not, be employed for any of the foregoing thresholds, such as critical LATA-level threshold 303 (FIG. 3), major LATA-level threshold 305, major network equipment level thresholds 309, 315, 321, 327, and critical network equipment level thresholds 307, 313, 319, 325. Illustratively, the amount of IP space added to a LATA, such as first LATA 121 (FIG. 1), depends upon the historic growth of end users who have utilized IP pools on a specific BRAS, such as first BRAS 113. However, in order for administrator-configurable LATA thresholds to function properly, IP Pool Management Server 126 and/or NMS 128 must have IP space available for assignment to first BRAS 113. Accordingly, in the event that IP Pool Management Server 126 and/or NMS 128 runs out of available IP space, an administrator is alerted such that additional IP space for assignment to first BRAS 113 can be added to IP Pool Management Server 126 and/or NMS 128.

Conceptually, major network equipment level thresholds 309, 315, 321, 327 (FIG. 3) and critical network equipment level thresholds 307, 313, 319, 325 are indicative of the amount of IP addresses in an IP pool created on network equipment allocated to user (e.g. PPP) sessions. For purposes of the present example, this network equipment includes BRASs 113-116 (FIG. 1). Critical LATA-level threshold 303 (FIG. 3) and major LATA-level threshold 305 are employed to signify the number of IP addresses in a LATA that are allocated to BRASs. Accordingly, critical LATA-level threshold 303 and major LATA-level threshold 305 indicate to administrative personnel that more IP address space is needed in a given LATA (such as first LATA 121, FIG. 1), and perhaps needs to be requested from ARIN. On the other hand, major network equipment level thresholds 309, 315, 321, 327 (FIG. 3), as well as critical network equipment level thresholds 307, 313, 319, 325, are used to indicate that IP Pool Management Server 126 and/or NMS 128 (FIG. 1) needs to add more IP pools to a BRAS of BRASs 113-117 from reserved LATA IP space 203 (FIG. 2) allocated to a designated LATA (i.e., first LATA 121, FIG. 1). Pursuant to the illustrative example of FIG. 3, if only 10% to 20% of the IP addresses in an IP pool allocated to an BRAS remain for subsequent allocation to incoming user (e.g. PPP) sessions (as shown in first BRAS IP space utilization 311), this reduction in available IP addresses is used as a trigger to allocate more space from the LATA level to the network equipment level.

Figure 4:
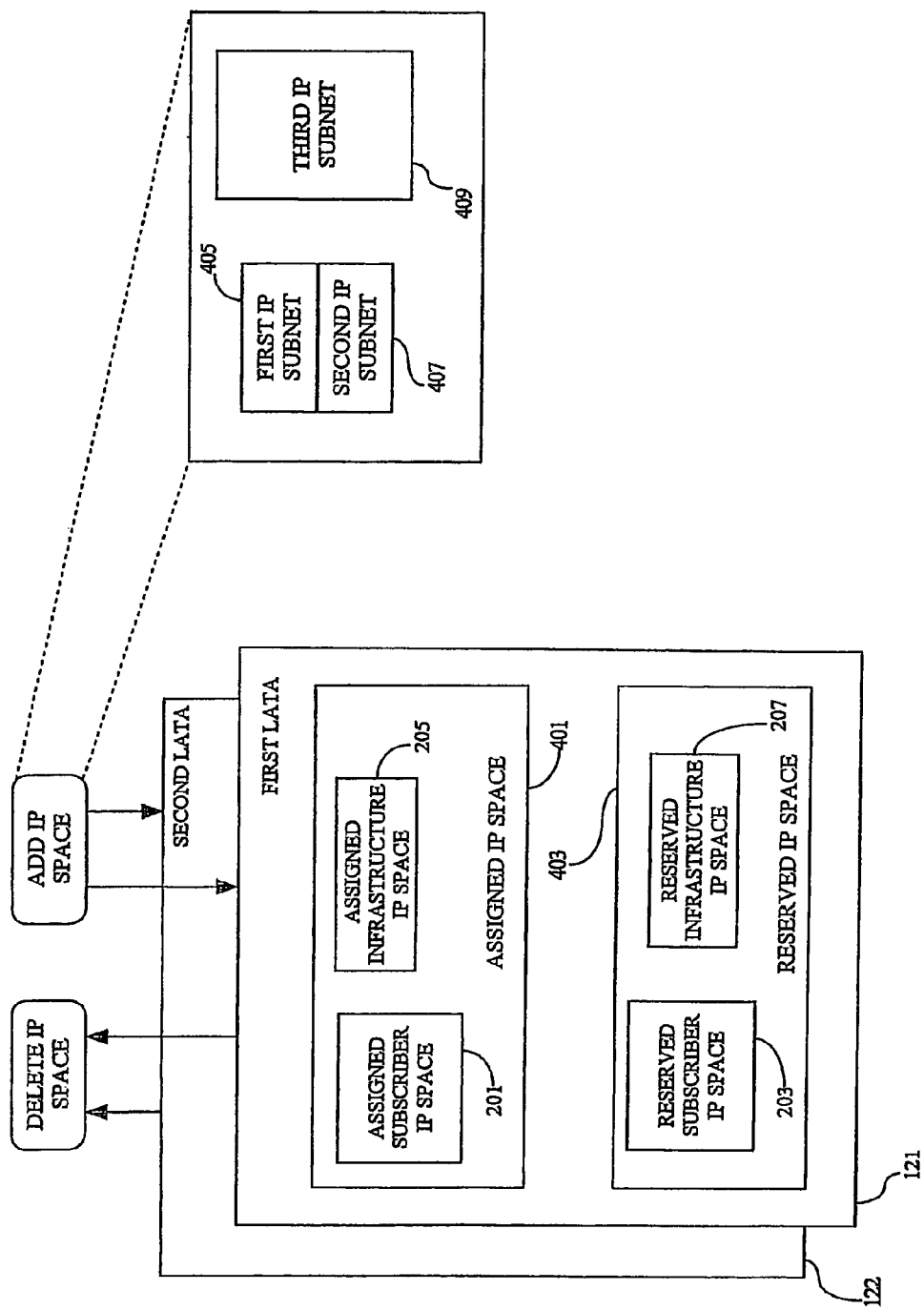
FIG. 4 is a data structure diagram showing exemplary IP space within a LATA hierarchical level such that the IP space is divided into smaller subnets of IP space.

FIG. 4 is a data structure diagram showing IP space for a LATA hierarchical level corresponding to LATAs 121, 122 (FIG. 1). Different sizes of IP space can be added to or deleted from the LATA hierarchical level of FIG. 4. The IP space of FIG. 4 is divided into smaller subnets of IP space, illustratively following a normal rule of subnetting IP subnets known to those of ordinary skill in the relevant art. Within the LATA hierarchical level, different types of IP space may be provided (as indicated previously), such as subscriber IP space, and infrastructure IP space. Also, IP space may have any of two or more states associated therewith, such as "assigned" and "reserved". As previously discussed in connection with FIG. 2, an assigned subscriber IP space 201 (FIGS. 2 and 4), a reserved subscriber IP space 203, an assigned infrastructure IP space 205, and a reserved infrastructure IP space 207 are all allocated to first LATA 121 (FIGS. 1, 2 and 4). IP space is also allocated to other LATAs, such as second LATA 122, in a manner similar to that shown in FIG. 4 with respect to first LATA 121.

Figure 5:
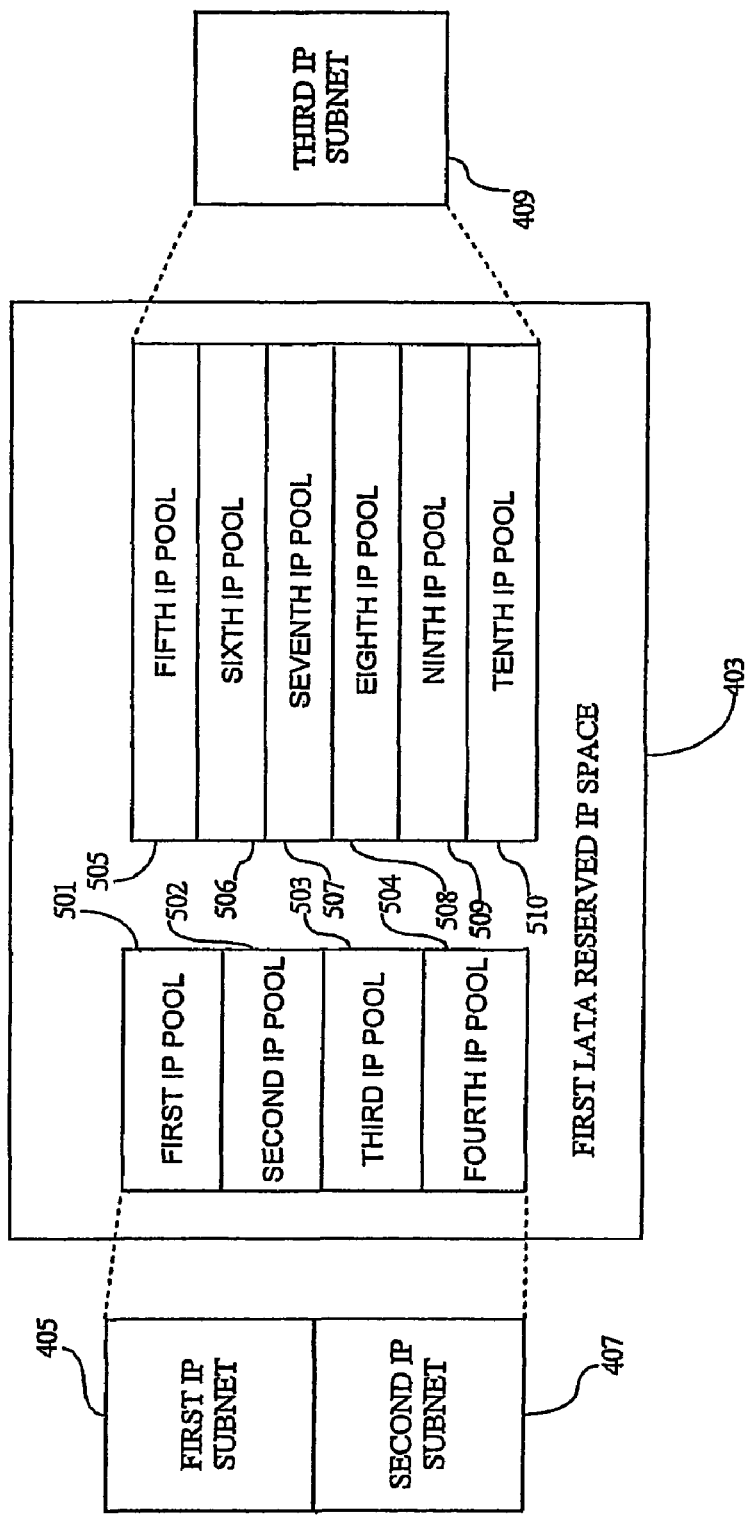
FIG. 5 is a data structure diagram showing division of larger subnets of IP space into smaller subnets of IP space to provide for allocation of fixed size IP pools or non-uniformly sized IP pools or both.

IP space may be added to a LATA, or deleted from a LATA, using blocks of IP space organized into one or more subnets. For example, if it is desired to allocate additional IP space to first LATA 121 (FIG. 4), a first IP subnet 405, a second IP subnet 407, and a third IP subnet 409 may be added to first LATA 121. At the highest level, a plurality or collection of IP pools is referred to as IP space. IP space signifies a number of IP subnets that have been entered into a system which: (a) may be non-contiguous with respect to one another; (b) may be further subnetted into smaller IP subnets; (c) may be of a different size than another IP subnet; or (d) may be preconditioned to a fixed size. If fixed size IP pools are used, larger IP subnets may be divided into two or more IP subnets of equal size FIG. 5 is a data structure diagram showing division of the subnets of IP space previously described in conjunction with FIG. 4 into smaller subnets of IP space. The illustrative example of FIG. 5 is applicable to situations where fixed-size IP pools are to be allocated. For example, first and second IP subnets 405, 407 (FIGS. 4 and 5) may together comprise a first IP pool 501, a second IP pool 502, a third IP pool 503, and a fourth IP pool 504. Third IP subnet 409 may comprise a fifth through a tenth IP pool 505, 506, 507, 508, 509, 510. Taken together, first through ninth IP pools 501-510 comprise a first LATA reserved IP space 403. Although IP pools 501-504 appear to be of a different size than IP pools 505-510, this is only for purposes of illustration, as IP pools 501-510 may, but need not, all be of the same size.

Figure 6:
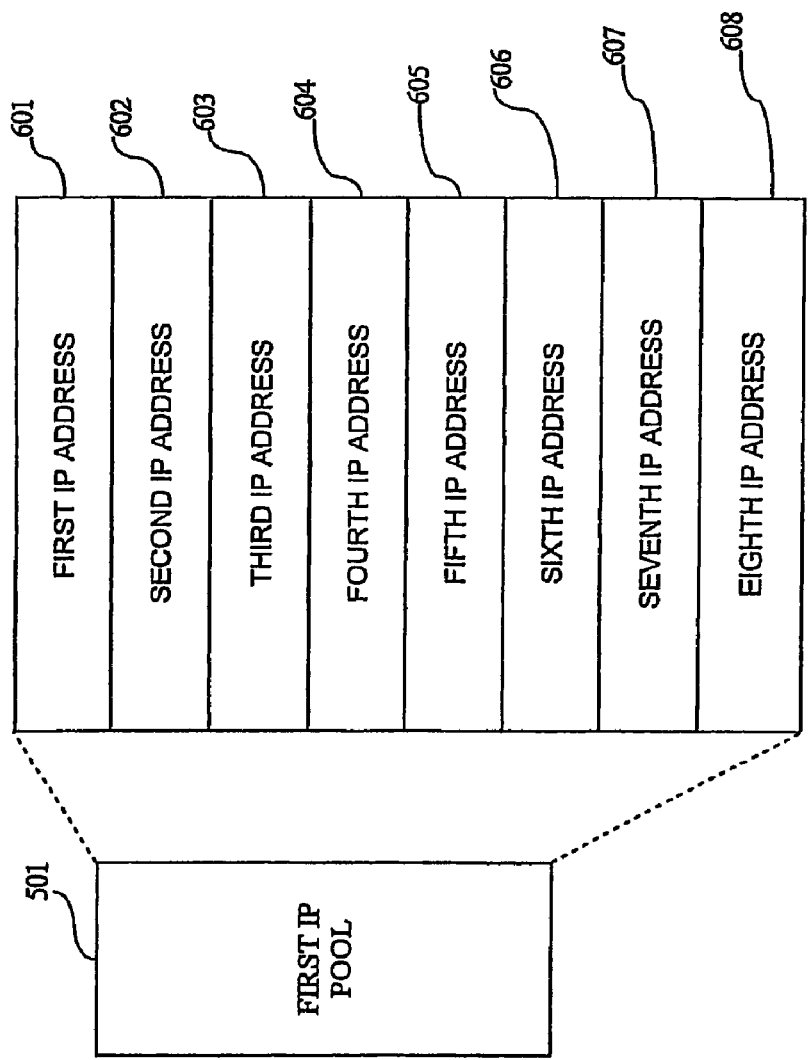
FIG. 6 is a data structure diagram showing an exemplary format for an illustrative IP pool.

FIG. 6 is a data structure diagram showing an exemplary format for the IP pools shown in FIG. 5. An IP pool may be defined as a single IP subnet. An IP subnet is a contiguous range of IP addresses with a starting address, an ending address, and no address gaps. For example, first IP pool 501 includes a first IP address 601, a second IP address 602, a third IP address 603, a fourth IP address 604, a fifth IP address 605, a sixth IP address 606, a seventh IP address 607, and an eighth IP address 608. First through eighth IP addresses 601, 602, 603, 604, 605, 606, 607, 608 are consecutive. For illustrative purposes, all IP pools could, but need not, contain the same number of IP addresses.

FIG. 7 is a data structure diagram showing an exemplary IP pool defined using fixed IP address boundaries. Size of an IP pool, in terms of the number of IP addresses included in the pool, can be expressed using any of several different approaches. For example, either of a classless system or a classful system may be employed to apply a hierarchy to an IP address to indicate networks, subnetworks, and hosts. In a classful system, there are fixed boundaries in IP addresses about where the network and the subnetwork start. As shown in FIG. 7, a classful system uses five classes denoted as A, B, C, D, and E. Each of these classes has a corresponding start address and end address. For example, Class A includes a start address of 1.0.0.0 and an end address of 126.0.0.0. The last column of FIG. 7, labeled "CIDR Notation", identifies IP addresses using a classless system. Whereas the classful system provides for a fixed boundary on subnets, effectively limiting the address space to be divided into only 5 different size subnets, the classless system provides for variable IP subnet boundaries, allowing for subnets of any size in theory between $2^0$ and $2^{32}$ (from a practical standpoint, this range may be smaller due to possible implementation of business practices or rules). In providing backwards compatibility to fixed IP address boundaries, a Class A address uses a CIDR notation of /8, showing that the first 8 bytes are used to indicate the network, thereby leaving 24 bytes remaining to indicate subnetworks and hosts. A Class B address uses a CIDR notation of /16, and a class C address has a CIDR notation of /24.

Illustratively, the types of IP addresses managed by the techniques disclosed herein may, but need not, be in the range identified in FIG. 7 as Class C. For an IP address of 32 bits in length, categorized in 4 bytes, a Class C address signifies that the first three bytes (as read from left to right) indicate the network, which leaves only one byte (where one byte is eight bits) for hosts. This results in an IP pool having a size of 1 byte, or 256 (2 to the eighth power) IP addresses. In general IP terminology, an IP subnet and therefore IP pools have reserved IP addresses that cannot be used to assign to hosts. These reserved IP addresses are: (a) an identifier for the IP subnet, which is usually the first IP address of the IP subnet and is used to identify the IP subnet (and the IP pool); (b) a second reserved IP address which is the last IP address serving as a broadcast IP address, signifying that any packet sent to that address will be sent to all hosts within that subnet (usually only the IP subnet); and optionally (c) one or more additional IP addresses (such as a loopback IP address) that for management purposes are possibly chosen to be consecutive to other "reserved" IP addresses within such subnets.

In view of the foregoing considerations, IP pools may, but need not, be specified differently from IP subnets. Illustratively, at least two IP addresses are reserved (first and last), with a potential for reserving more IP addresses not allowed to be used for assignment to hosts. This effectively leaves 254 or less usable IP addresses in an IP pool of class C (subnet /24). For illustrative purposes, assume that class C space, i.e., between 192.0.0.0 and 223.255.255.0, is received from ARIN. This IP space can be subdivided into smaller IP subnets. Further assume that an ISP obtains class C space of size /18 (i.e. $2^{14}$ addresses=8192 addresses). This space can be divided into smaller subnets using bigger subnet masks, for instance into $2^6$=64 class C subnets, all the way up to an IP subnet that has one IP address (theoretically and practically,) as a loopback address is often configured as a subnet of size /32.

FIG. 8 is a data structure diagram setting forth an exemplary structure for defining one or more objects used to manage IP pools in accordance with any of the previous implementations discussed herein in connection with FIGS. 1-7. As shown in FIG. 8, IP pools may be managed using one or more objects having IP pool ranges, each range having a beginning address denoted as startAddress and an ending address denoted as endAddress. The exemplary structure shown in FIG. 8 may be adapted, customized, modified, or expanded to implement any or all of the following functionalities: (a) managing an IP pool; (b) identifying a type of IP pool (subscriber, infrastructure); (c) specifying IP pool allocation status (whether "assigned" or "reserved" for future allocation); (d) specifying a list of subscriber IP pools assigned to a BRAS; (e) specifying a list of subscriber IP pools assigned to a LATA; (f) specifying a list of infrastructure IP pools assigned to a LATA; (g) specifying a list of threshold values for subscriber IP pools per LATA; and (h) specifying a list of threshold values for infrastructure IP pools per LATA.

Pursuant to exemplary embodiments disclosed herein, methods automatically allocate IP pools to network equipment. The network equipment is repeatedly, periodically, or continuously monitored to detect IP pool utilization. If the monitoring indicates an increase in IP pool utilization above a predetermined threshold, a quantity of required IP pools is forecast. The quantity of required IP pools is removed from an inventory of available IP pools and automatically assigned to the network equipment. Automatic management refers to the fact that human intervention is not required, except for a manual addition of one or more IP pools to the inventory of available IP pools if the inventory decreases below a desired or predetermined amount. This inventory may be managed by IP Pool Management Server 126 and/or NMS 128.

Figure 9A:
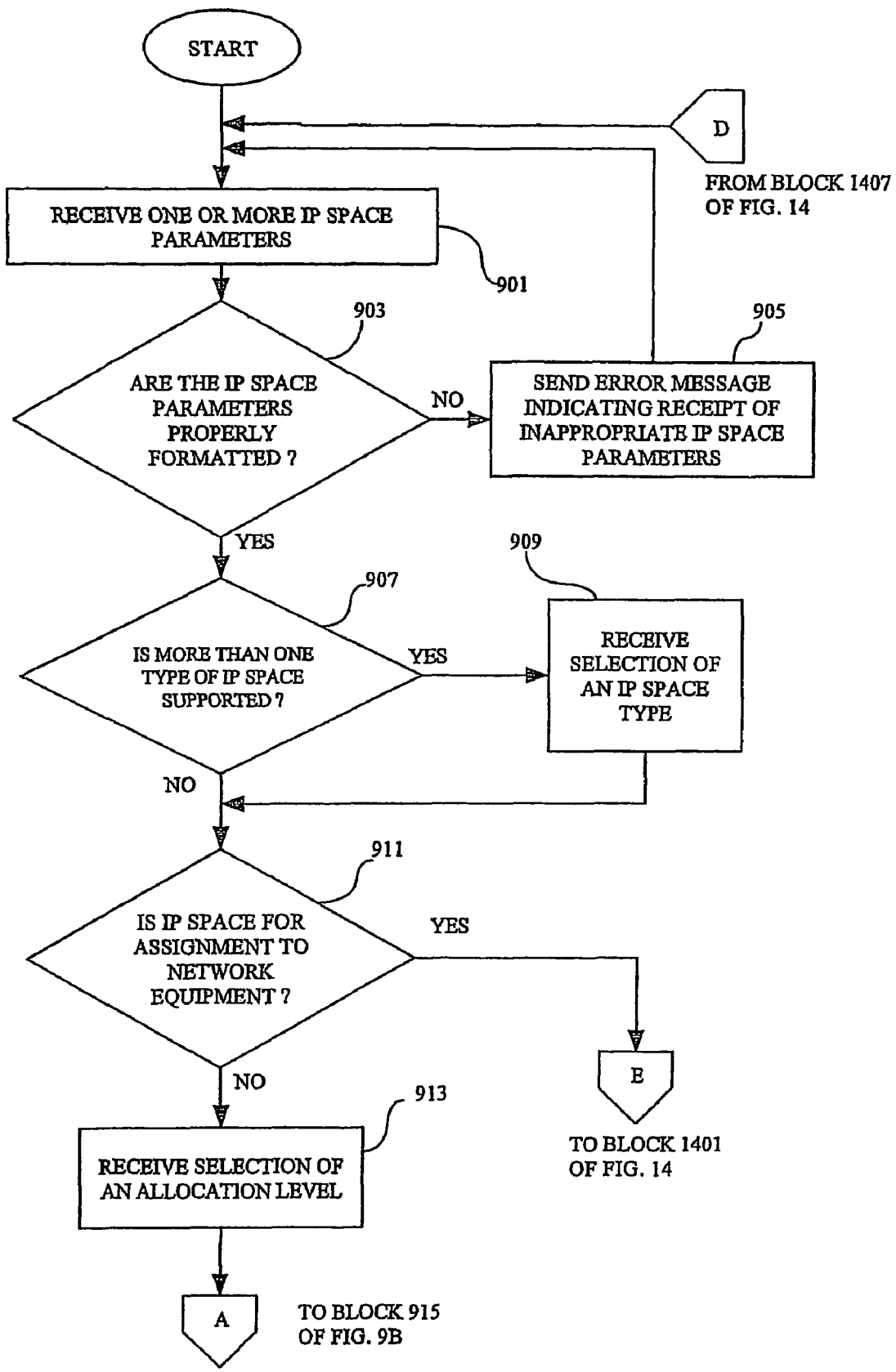
FIGS. 9A-9B together comprise a flowchart setting forth an exemplary process for entering IP space into an IP pool management system.
Figure 9B:
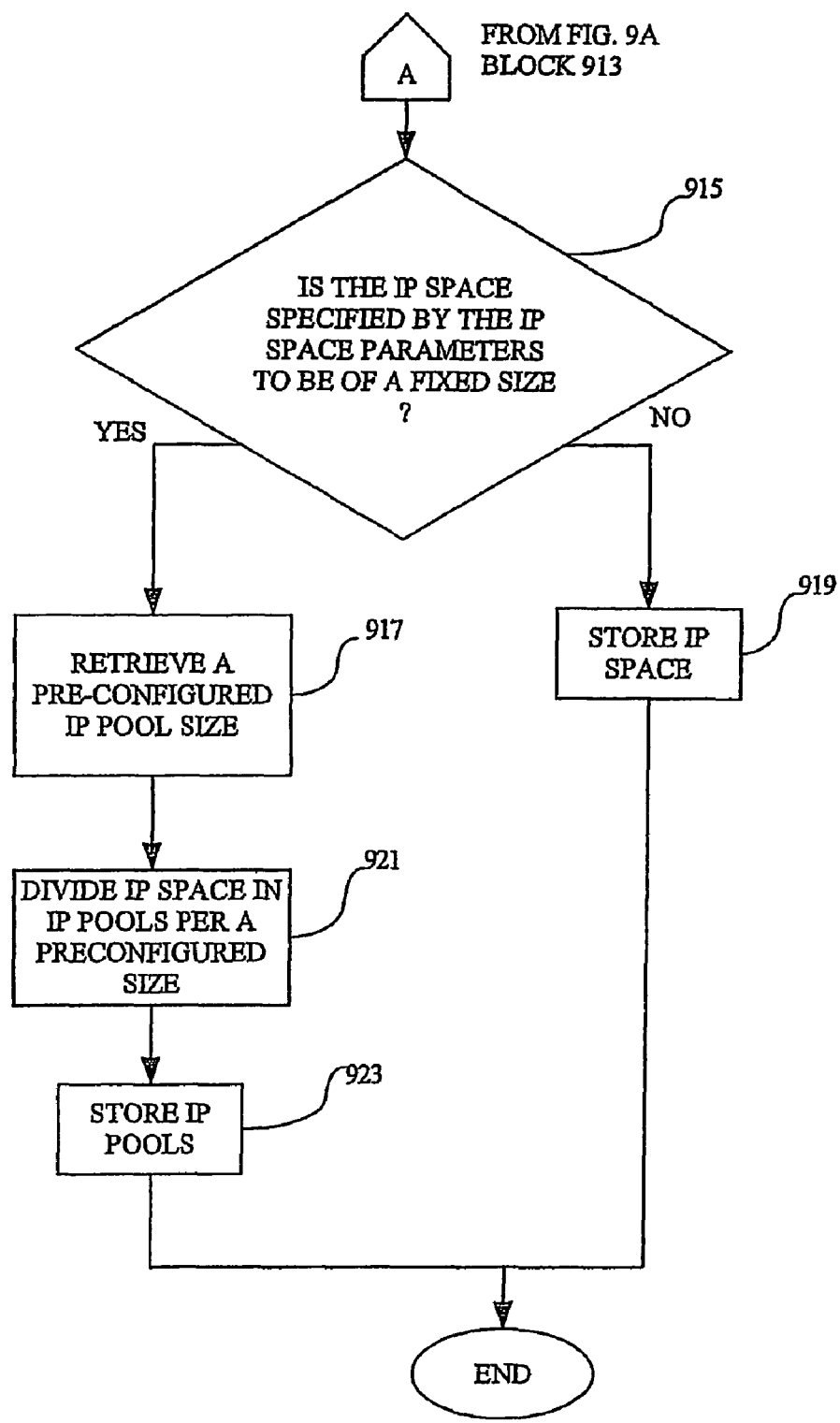

FIGS. 9A-9B together comprise a flowchart setting forth an exemplary process for entering IP space into an inventory of an IP pool management system, e.g. IP Pool Management Server 126 and/or NMS 128. The process commences at block 901 (FIG. 9A) where one or more IP space parameters are received which specify one or more IP pools. At block 903, a test is performed to ascertain whether or not the IP space parameters are properly formatted. If not, an error message is sent indicating receipt of inappropriate IP space parameters (block 905), and the process loops back to block 901.

The affirmative branch from block 903 leads to block 907 where a test is performed to ascertain whether or not more than one type of IP space is supported (as, for example, subscriber space and infrastructure space). If so, the process advances to block 909 where a selection is received of an IP space type. The process then advances to block 911. The negative branch from block 907 also leads to block 911.

At block 911, a test is performed to ascertain whether or not the IP space is for assignment to network equipment. If so, the process advances to block 1401 of FIG. 14, to be described in greater detail hereinafter. The negative branch from block 911 (FIG. 9A) leads to block 913 where a selection is received of an allocation level (e.g. LATA, or other). The process then advances to block 915 (FIG. 9B) where a test is performed to ascertain whether or not the IP space specified by the IP space parameters is to be of a fixed size. If so, a pre-configured IP pool size is retrieved (block 917), IP space in the IP pools is divided according to a preconfigured size (block 921), and the IP pools are then stored in an inventory of available IP pools (block 923). The negative branch from block 915 leads to block 919 where IP space is stored in an inventory of available IP pools.

Figure 10A:
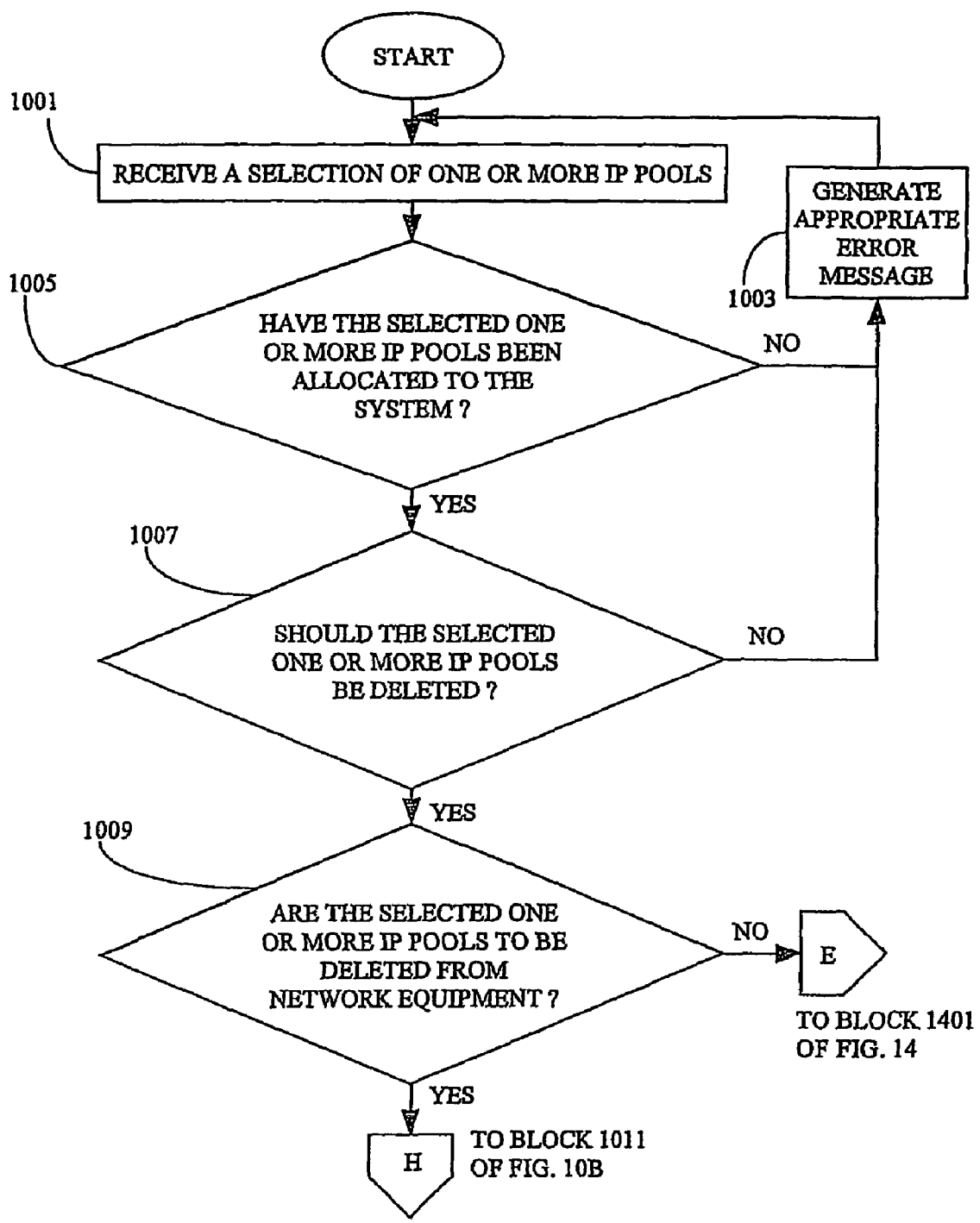
FIGS. 10A-10B together comprise a flowchart setting forth an exemplary process for removing IP space from an IP pool management system.
Figure 10B:
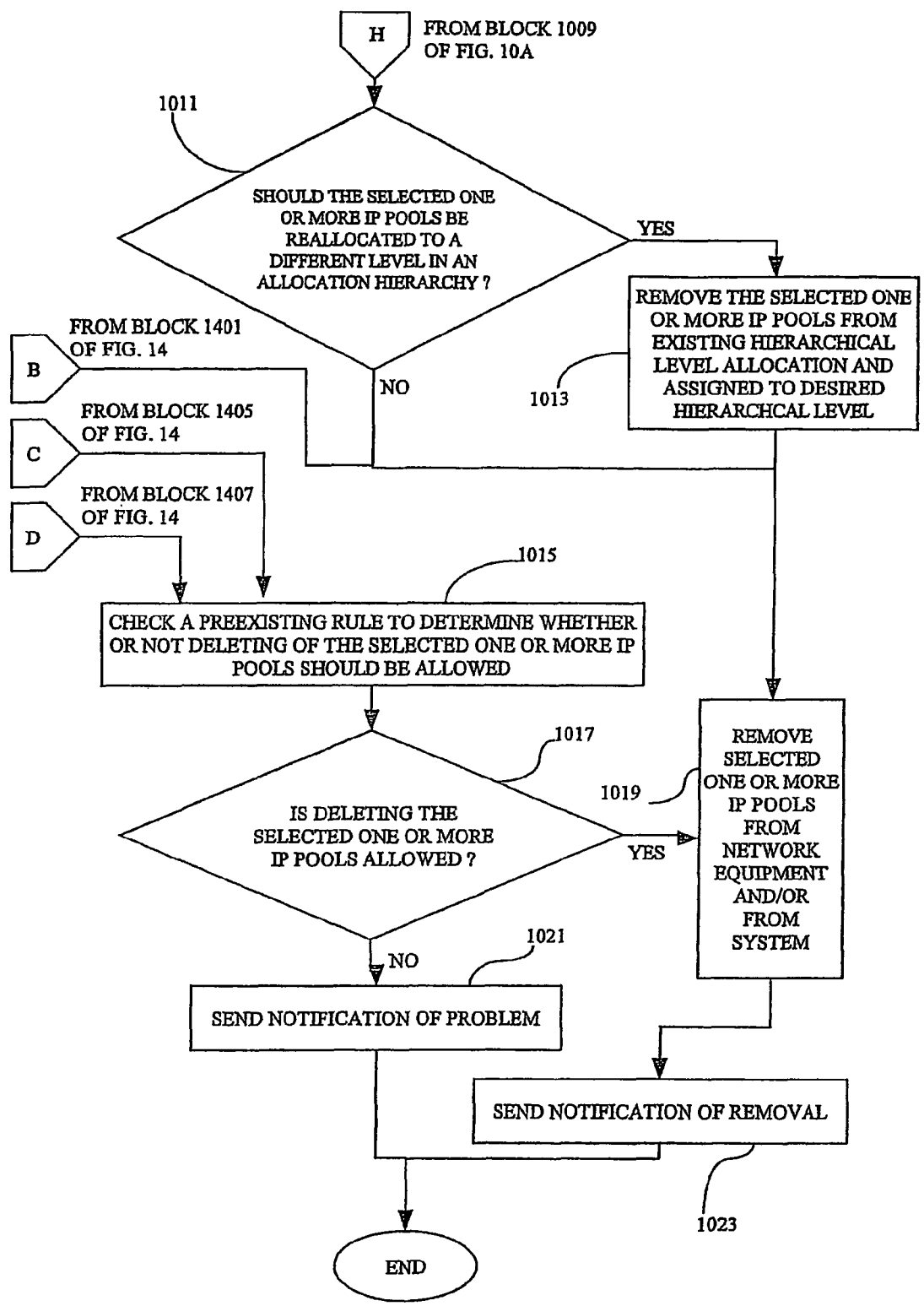

FIGS. 10A-10B together comprise a flowchart setting forth an exemplary process for removing IP space from an inventory of available IP pools on an IP pool management system, e.g. IP Pool Management Server 126 and/or NMS 128. The process commences at block 1001 (FIG. 10A) where a selection of one or more IP pools is received. At block 1005, a test is performed to ascertain whether or not the selected one or more IP pools have been allocated to the system. If not, an appropriate error message is generated (block 1003), and the process loops back to block 1001. The affirmative branch from block 1005 leads to block 1007 where a test is performed to ascertain whether or not the selected one or more IP pools should be deleted. If not, the process loops back to block 1003 (described previously). The affirmative branch from block 1007 leads to block 1009 where a test is performed to ascertain whether or not the selected one or more IP pools are to be deleted from network equipment. If not, the process advances to block 1401 of FIG. 14, to be described in greater detail hereinafter.

The affirmative branch from block 1009 (FIG. 10A) leads to block 1011 (FIG. 10B) where a test is performed to ascertain whether or not the selected one or more IP pools should be reallocated to a different level in an allocation hierarchy, if such is supported. If so, the selected one or more IP pools are removed from an existing hierarchical level allocation and assigned to a desired hierarchical level (block 1013). The process then progresses to block 1019. The negative branch from block 1011 also leads to block 1019, where the selected one or more IP pools are removed from the network equipment and/or from the inventory of available IP pools on the IP pool management system. A notification of removal is then sent (block 1023). This notification may be sent, for example, to a system administrator at IP pool management server 126 and/or NMS 128 (FIG. 1).

Block 1015 (FIG. 10B) is performed after the operation of block 1405 (FIG. 14) has been performed, or after the operation of block 1407 (FIG. 14) has been performed. Blocks 1405 and 1407 of FIG. 14 will be described in greater detail hereinafter. Returning to block 1015 of FIG. 10B, a preexisting rule is checked to enable a determination as to whether a selected one or more IP pools should be deleted. Based upon application of the preexisting rule, at block 1017, a test is performed to ascertain whether or not deleting the selected one or more IP pools is allowed. If so, the process advances to block 1019 (described previously). The negative branch from block 1017 leads to block 1021 where notification of a problem is sent. This notification may be sent, for example, to a system administrator at IP pool management server 126 and/or NMS 128 (FIG. 1).

Figure 11A:
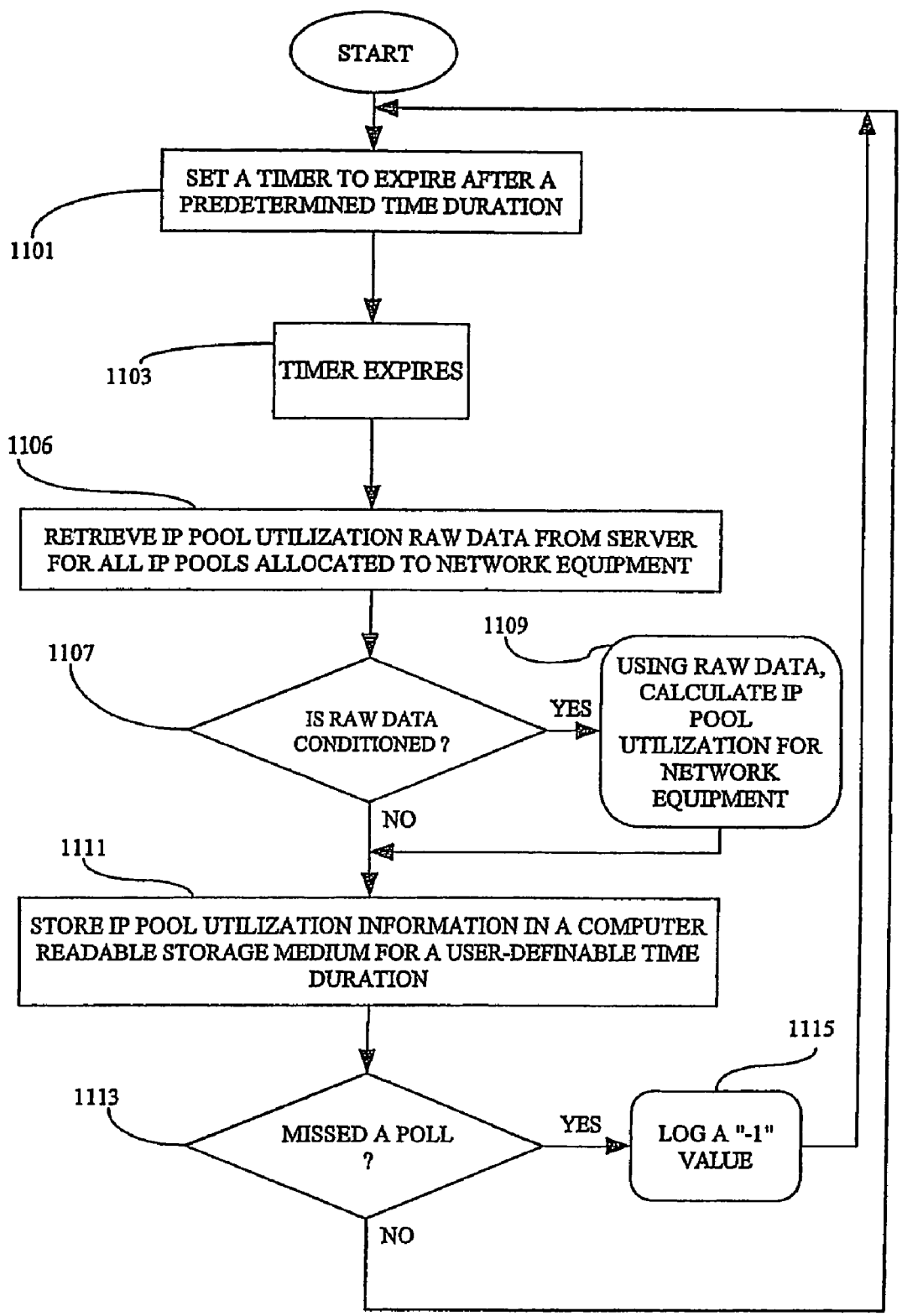
FIGS. 11A-11B together comprise a flowchart setting forth exemplary processes for polling network equipment IP pool utilization data.
Figure 11B:
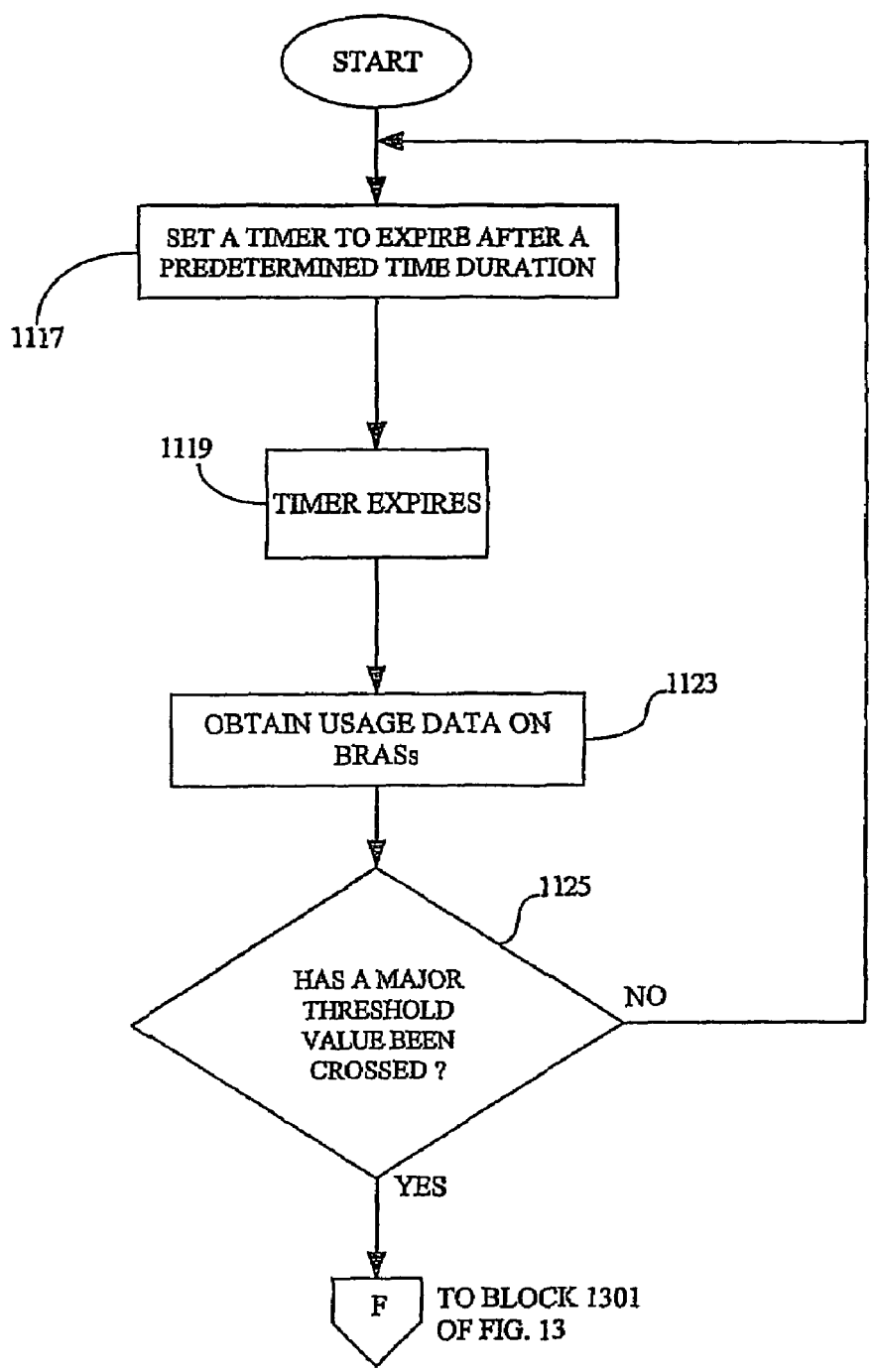

FIGS. 11A-11B together comprise a flowchart setting forth exemplary processes for polling network equipment IP pool utilization data in the event that the network equipment does not support any mechanisms to provide IP Pool utilization data itself to the IP Pool management server 126 and/or NMS 128. The process commences at block 1101 (FIG. 11A) where a timer is set to expire after a predetermined time duration. The timer expires at block 1103. At block 1106, IP pool utilization raw data is retrieved from IP pool management server 126 and/or NMS 128 (FIG. 1) for all IP pools allocated to network equipment. At block 1107 (FIG. 11A), a test is performed to ascertain whether or not the raw data retrieved at block 1106 is conditioned. If so, then the process advances to block 1109 where, using the raw data, IP pool utilization is calculated for the network equipment. The process then advances to block 1111. The negative branch from block 1107 also leads to block 111. At block 1111, IP pool utilization data information is stored in a computer readable storage medium for a user-definable time duration. Next, at block 1113, a test is performed to ascertain whether or not a poll has been missed. If so, the process logs a "−1" value at block 1115, and the process then loops back to block 1101. The negative branch from block 1113 leads back to block 1101.

The process of FIG. 11B commences at block 1117 where a timer is set to expire after a predetermined time duration. The timer expires at block 1119. At block 1123, usage data regarding network equipment (e.g. BRASs such as BRASs 113-117 of FIG. 1) is obtained. A test is performed at block 1125 (FIG. 11B) to ascertain whether or not a major threshold value has been crossed. If not, the process loops back to block 1117. The affirmative branch from block 1125 leads to block 1301 of FIG. 13 (to be described in greater detail hereinafter).

Figure 12:
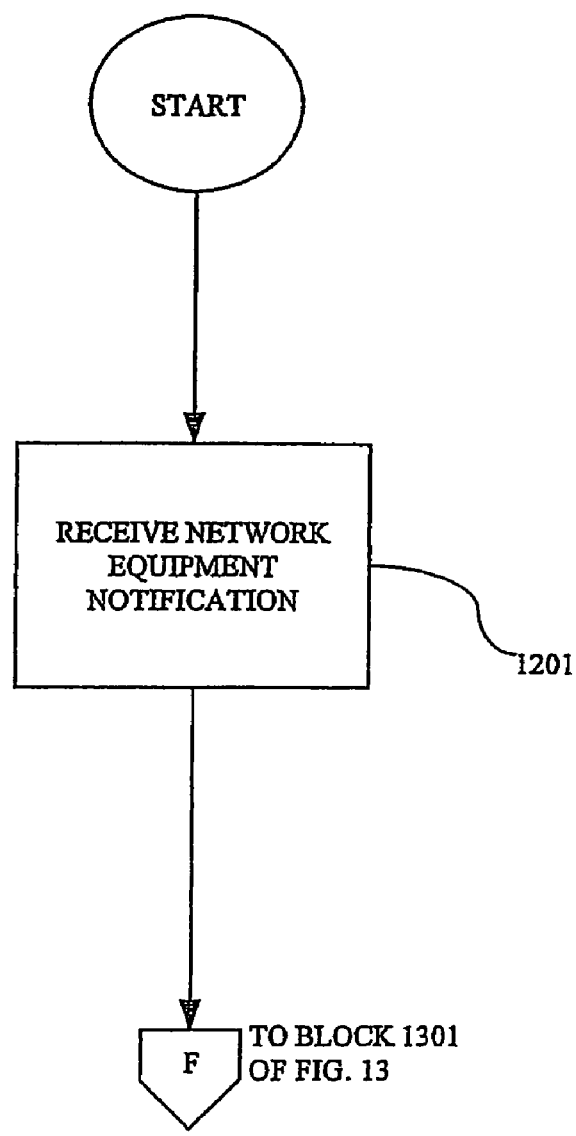
FIG. 12 is a flowchart setting forth an illustrative procedure for processing network equipment IP pool over utilization notifications.

FIG. 12 is a flowchart setting forth an illustrative procedure for processing network equipment IP pool overutilization notifications in the event sending IP Pool utilization data to IP Pool management system 126 and/or NMS 128 is supported. The procedure commences at block 1201 where a network equipment notification is received. The procedure then advances to block 1301 of FIG. 13 (to be described in greater detail hereinafter).

Figure 13:
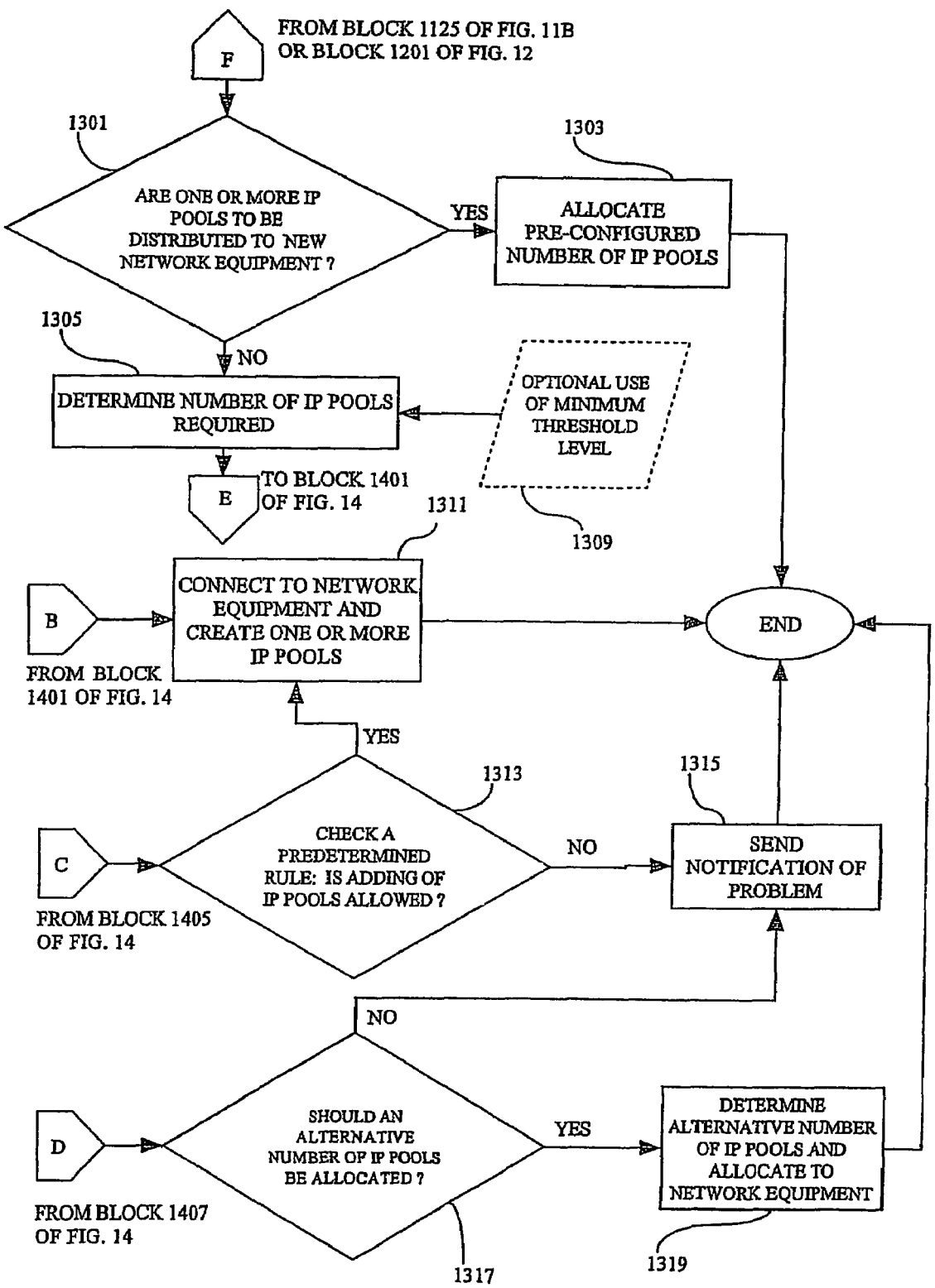
FIG. 13 is a flowchart setting forth an illustrative procedure for distributing IP space in conjunction with the procedures set forth in FIGS. 12 and 14.
Figure 14:
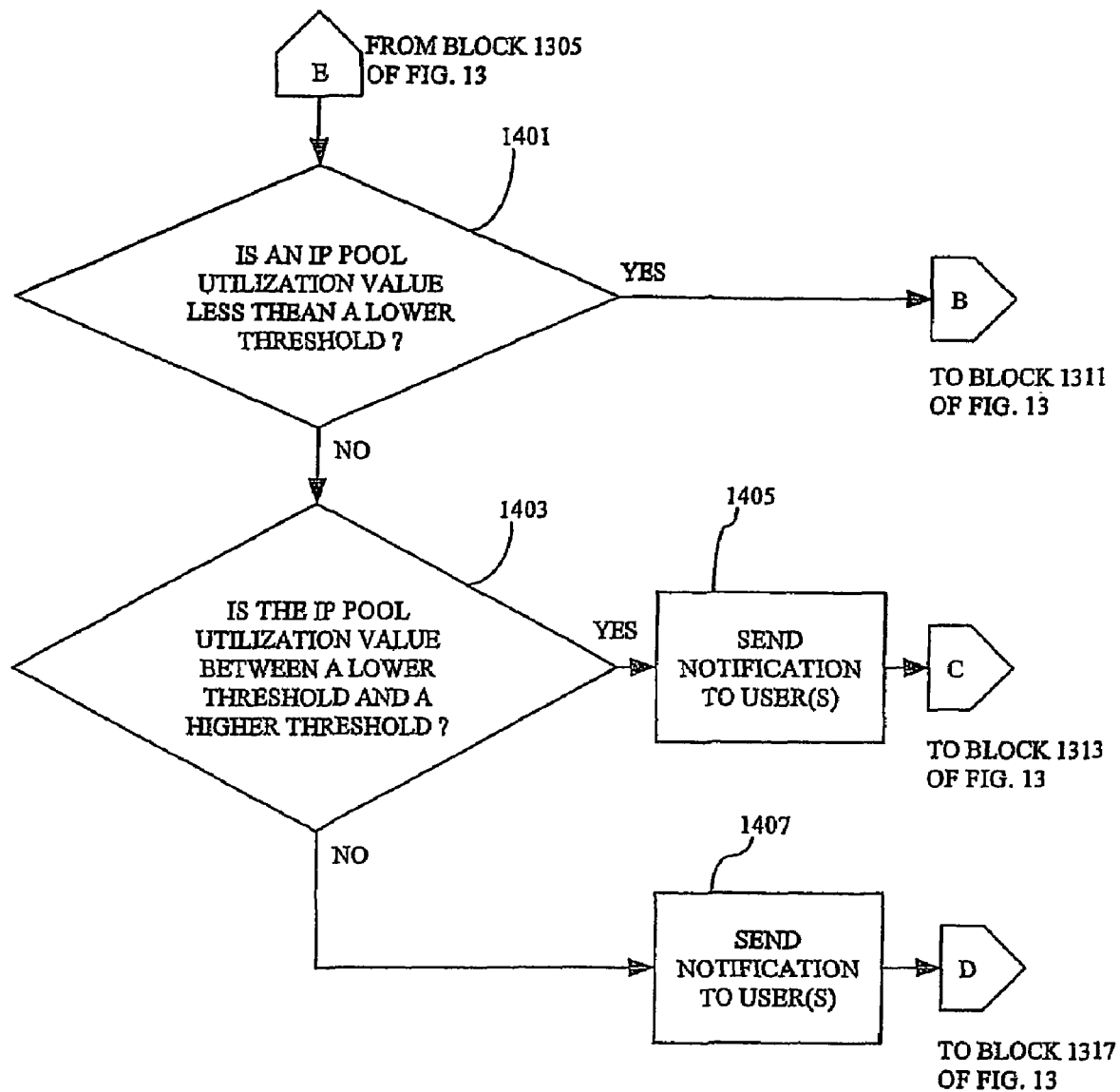
FIG. 14 is a flowchart setting forth an illustrative procedure for providing top-level threshold management for use in conjunction with the procedure of FIG. 13.

FIG. 13 is a flowchart setting forth an illustrative procedure for distributing IP space in conjunction with the procedures set forth in FIGS. 12 and 14. More specifically, the procedure of FIG. 13 commences at block 1301 after block 1125 (FIG. 11B) or block 1201 (FIG. 12) has been performed. At block 1301 (FIG. 13), a test is performed to ascertain whether or not there are one or more IP pools to be distributed to new (i.e. newly introduced into a system and not previously present) network equipment. If not, the procedure advances to block 1305 where a required number (quantity) of IP pools is determined. This may be accomplished using any of various approaches, including but not limited to using a predefined number of IP Pools, using a prediction mechanism (such as supported by a forecasting mechanism described herein), using another threshold value (a minimum threshold value), or various combinations thereof. Optionally, block 1305 is performed in conjunction with block 1309 such that a minimum threshold level is employed when the required number of IP pools is determined. The procedure then advances to block 1401 of FIG. 14 (to be described in greater detail hereinafter). The affirmative branch from block 1301 (FIG. 13) leads to block 1303 where a pre-configured number of IP pools are allocated. This is to support situations where new network equipment does not have any previously assigned IP Pools. The IP Pool Management server 126 and/or NMS 128 does not have any prior knowledge as to how many IP pools to add to the network equipment. Hence, a business rule can be implemented, e.g. by assigning one IP Pool.

Block 1311 is performed after block 1401 of FIG. 14 (described hereinafter) is performed. At block 1311 (FIG. 13), IP pool management server 126 and/or NMS 128 (FIG. 1) connects to network equipment (e.g. BRASs) on network 107 and creates one or more IP pools. Block 1313 (FIG. 13) is performed after block 1405 of FIG. 14 (described hereinafter) is performed. At block 1313 (FIG. 13), by checking a predetermined rule, a test is performed to ascertain whether or not adding of IP pools is allowed. This mechanism is in place to protect the amount of "reserved" IP space available within the system for assignment. If so, the procedure advances to block 1311 (described previously). The negative branch from block 1313 leads to block 1315 where a notification of a problem is sent to IP pool management server 126 and/or NMS 128 (FIG. 1).

Block 1317 (FIG. 13) is performed after block 1407 of FIG. 14 (described hereinafter) is performed. At block 1317 (FIG. 13), a test is performed to ascertain whether or not an alternative number of IP pools should be allocated. This mechanism is in place in case the forecasted number of IP Pools would exhaust the total number of available "reserved" IP Pools in the system and the network equipment still would benefit from assigning more IP space, even if the forecasted amount can not be provided. If not, the procedure advances to block 1315 (described previously). The affirmative branch from block 1315 leads to block 1319 where an alternative number of IP pools is determined and allocated to network equipment.

FIG. 14 is a flowchart setting forth an illustrative procedure for providing threshold management for use in conjunction with the procedure of FIG. 13. The procedure of FIG. 14 commences at block 1401 after block 1305 (FIG. 13) has been performed. At block 1401 (FIG. 14), a test is performed to ascertain whether or not an IP pool utilization value is less than a lower threshold. If so, the procedure loops back to block 1311 of FIG. 13 (described previously). The negative branch from block 1401 (FIG. 14) leads to block 1403 where a test is performed to ascertain whether or not the IP pool utilization value is between a lower threshold and a higher threshold. If so, then at block 1405, a notification is sent to an administrative user at IP pool management server 126 and/or NMS 128 (FIG. 1) indicating that the IP pool utilization value is between the lower and higher thresholds. The negative branch from block 1403 (FIG. 14) leads to block 1407 where a notification is sent to an administrative user at IP pool management server 126 and/or NMS 128 (FIG. 1) indicating that the IP pool utilization value is not between the lower and higher thresholds, but above the higher threshold level.

Figure 15:
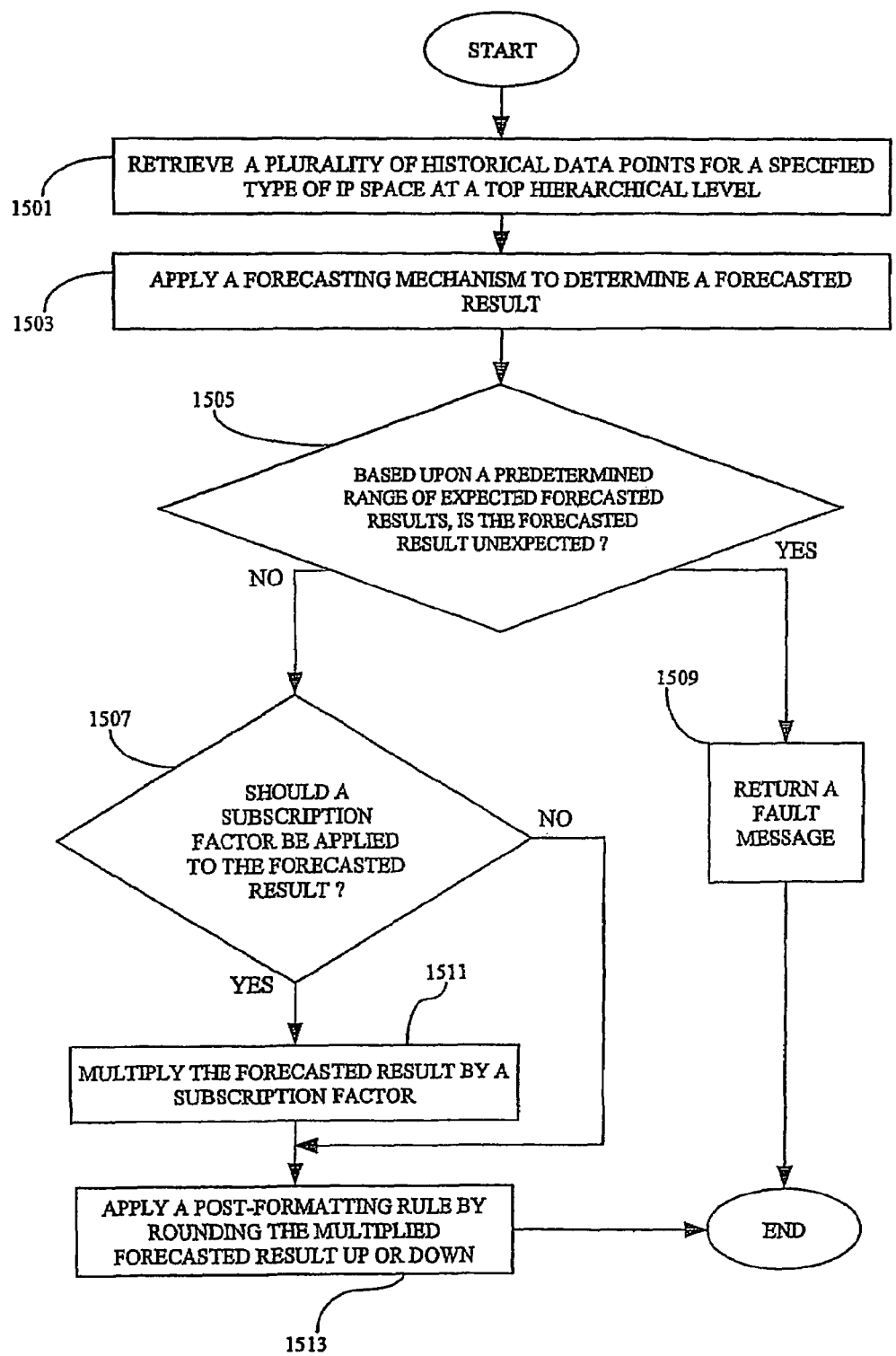
FIG. 15 is a flowchart setting forth an illustrative procedure for forecasting demand for IP space.

FIG. 15 is a flowchart setting forth an illustrative procedure for forecasting demand for IP space. The procedure commences at block 1501 where a plurality of historical data points are received for a specified type of IP space at a top hierarchical level. Next, a forecasting mechanism is applied to determine a forecasted result (block 1503). A test is performed at block 1505 to ascertain, based upon a predetermined range of expected forecasted results, whether or not the forecasted result is unexpected. If so, the procedure advances to block 1509 where a fault message is returned to an administrative user at IP pool management server 126 (FIG. 1) indicating that the forecasted result is unexpected. The negative branch from block 1505 leads to block 1507 where a test is performed to ascertain whether or not a subscription factor should be applied to the forecasted result. If not, the program advances to block 1513 (to be described hereinafter). The affirmative branch from block 1507 leads to block 1511 where the forecasted result is multiplied by a subscription factor. Next, at block 1513, a post-formatting rule is applied by rounding the multiplied forecasted result up or down.

As described heretofore, the exemplary embodiments can be provided in the form of computer-implemented processes and apparatuses for practicing those processes. The exemplary embodiments can also be provided in the form of computer program code containing instructions embodied in tangible media, such as floppy diskettes, CD ROMs, hard drives, or any other computer-readable storage medium, wherein, when the computer program code is loaded into and executed by a computer, the computer becomes an apparatus for practicing the exemplary embodiments. The exemplary embodiments can also be provided in the form of computer program code, for example, whether stored in a storage medium, loaded into and/or executed by a computer, or transmitted over some transmission medium, loaded into and/or executed by a computer, or transmitted over some transmission medium, such as over electrical wiring or cabling, through fiber optics, or via electromagnetic radiation, wherein, when the computer program code is loaded into and executed by a computer, the computer becomes an apparatus for practicing the exemplary embodiments. When implemented on a general-purpose microprocessor, the computer program code segments configure the microprocessor to create specific logic circuits.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed for carrying out this invention, but that the invention will include all embodiments falling within the scope of the claims. Moreover, the use of the terms first, second, etc. do not denote any order or importance, but rather the terms first, second, etc. are used to distinguish one element from another. Furthermore, the use of the terms a, an, etc. do not denote a limitation of quantity, but rather denote the presence of at least one of the referenced item.

What is claimed is:

1. A method of automatically allocating, modifying, and deleting IP pools on network equipment, the method comprising:
   repeatedly, periodically, or continuously monitoring the network equipment to detect IP pool utilization; and
   if the monitoring indicates an increase in the IP pool utilization above a first predetermined threshold, forecasting a quantity of required IP pools, removing the forecasted quantity of required IP pools from an inventory of available IP pools, and automatically assigning the forecasted quantity of required IP pools to the network equipment;
   the monitoring including monitoring the network equipment for the IP pool utilization above each of a plurality of predetermined thresholds including at least a major threshold and a critical threshold, wherein the major threshold specifies a first percentage of IP pool utilization on the network equipment and the critical threshold specifies a second percentage of IP pool utilization on the network equipment, and the first percentage is less than the second percentage, wherein IP pool utilization above the major threshold initiates the assigning the forecasted quantity of required IP pools to the network equipment.

2. The method of claim 1 wherein, if the monitoring indicates a decrease in the IP pool utilization below a second predetermined threshold, such that the first and second predetermined thresholds may, but need not, be equal, then forecasting a quantity of IP pools to be removed, removing the forecasted quantity of IP pools from the network equipment, and automatically assigning the removed forecasted quantity of IP pools to the inventory of available IP pools.

3. The method of claim 1 further including allocating the inventory of available IP pools to any of a plurality of allocation levels including at least a LATA allocation level and a network equipment allocation level, wherein the network equipment allocation level corresponds to the network equipment used by a LATA in the LATA allocation level.

4. The method of claim 3 wherein the forecasting indicates that at least one IP pool should be assigned from the LATA allocation level to the network equipment allocation level.

5. The method of claim 1 wherein the first predetermined threshold is the major threshold .

6. The method of claim 1 wherein, if the IP pool utilization exceeds the first predetermined threshold, the method further includes transmitting an indication thereof to one or more users.

7. A computer program product comprising a non-transitory storage medium readable by a processing circuit and storing instructions for execution by the processing circuit for facilitating a method of automatically allocating IP pools to network equipment, the method comprising:
   repeatedly, periodically, or continuously monitoring the network equipment to detect IP pool utilization; and
   if the monitoring indicates an increase in the IP pool utilization above a first predetermined threshold, forecasting a quantity of required IP pools, removing the forecasted quantity of required IP pools from an inventory of available IP pools, and automatically assigning the forecasted quantity of required IP pools to the network equipment;
   the monitoring including monitoring the network equipment for the IP pool utilization above each of a plurality of predetermined thresholds including at least a major threshold and a critical threshold, wherein the major threshold specifies a first percentage of IP pool utilization on the network equipment and the critical threshold specifies a second percentage of IP pool utilization on the network equipment, and the first percentage is less than the second percentage, wherein IP pool utilization above the major threshold initiates the assigning the forecasted quantity of required IP pools to the network equipment.

8. The computer program product of claim 7 further including instructions wherein, if the monitoring indicates a decrease in the IP pool utilization below a second predetermined threshold, such that the first and second predetermined thresholds may, but need not, be equal, then forecasting a quantity of IP pools to be removed, removing the forecasted quantity of IP pools from the network equipment, and automatically assigning the removed forecasted quantity of IP pools to the inventory of available IP pools.

9. The computer program product of claim 7 further including instructions for allocating the inventory of available IP pools to any of a plurality of allocation levels including at least a LATA allocation level and a network equipment allocation level, wherein the network equipment allocation level corresponds to the network equipment used by a LATA in the LATA allocation level.

10. The computer program product of claim 9 wherein the forecasting indicates that at least one IP pool should be assigned from the LATA allocation level to the network equipment allocation level.

11. The computer program product of claim 7 wherein the first predetermined threshold is the major threshold.

12. The computer program product of claim 11 further including instructions wherein, if the IP pool utilization exceeds the first predetermined threshold, transmitting an indication thereof to one or more users.

13. A device for automatically allocating IP pools to network equipment, the device comprising:
   a processing mechanism; and a monitoring mechanism coupled to the processing mechanism;

wherein the monitoring mechanism is capable of repeatedly, periodically, or continuously monitoring the network equipment to detect IP pool utilization; and if the monitoring indicates an increase in the IP pool utilization above a first predetermined threshold, the processing mechanism forecasts a quantity of required IP pools, removes the forecasted quantity of required IP pools from an inventory of available IP pools, and automatically assigns the removed forecasted quantity of required IP pools to the network equipment;

the monitoring including monitoring the network equipment for the IP pool utilization above each of a plurality of predetermined thresholds including at least a major threshold and a critical threshold, wherein the major threshold specifies a first percentage of IP pool utilization on the network equipment and the critical threshold specifies a second percentage of IP pool utilization on the network equipment, and the first percentage is less than the second percentage, wherein IP pool utilization above the major threshold initiates the assigning the forecasted quantity of required IP pools to the network equipment.

14. The device of claim 13 wherein, if the monitoring mechanism detects a decrease in the IP pool utilization below a second predetermined threshold, such that the first and second predetermined thresholds may, but need not, be equal, then the processing mechanism forecasts a quantity of IP pools to be removed, removes the forecasted quantity of IP pools to be removed from the network equipment, and automatically assigns the removed forecasted quantity of IP pools to the inventory of available IP pools.

15. The device of claim 14 wherein the processing mechanism allocates the inventory of available IP pools to any of a plurality of allocation levels including at least a LATA allocation level and a network equipment allocation level, and wherein the network equipment allocation level corresponds to the network equipment used by a LATA in the LATA allocation level.

16. The device of claim 15 wherein the processing mechanism is capable of assigning at least one IP pool from the LATA allocation level to the network equipment allocation level in response to forecasting the quantity of required IP pools.

17. The device of claim 13 wherein the first predetermined threshold is the major threshold.

18. The device of claim 13 wherein, if the IP pool utilization exceeds the first predetermined threshold, the processing mechanism initiates transmission of an indication thereof to one or more users.

* * * * *